(12) United States Patent
Oshinowo et al.

(10) Patent No.: US 12,702,938 B2
(45) Date of Patent: Aug. 11, 2026

(54) COALESCER PLATE WITH PHYLLOTAXIS-DERIVED PATTERN

(71) Applicant: Saudi Arabian Oil Company, Dhahran (SA)

(72) Inventors: Olanrewaju Malcolm Oshinowo, Dhahran (SA); Fahad Saleh Alrashed, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 627 days.

(21) Appl. No.: 18/191,520

(22) Filed: Mar. 28, 2023

(65) Prior Publication Data

US 2023/0233958 A1 Jul. 27, 2023

Related U.S. Application Data

(62) Division of application No. 16/942,127, filed on Jul. 29, 2020, now Pat. No. 11,691,093.

(51) Int. Cl.

| | |
|---|---|
| ***B01D 17/04*** | (2006.01) |
| ***B01D 17/02*** | (2006.01) |
| ***B01D 21/00*** | (2006.01) |
| ***C02F 1/40*** | (2023.01) |

(52) U.S. Cl.

CPC ........ *B01D 17/045* (2013.01); *B01D 17/0211* (2013.01); *B01D 17/0214* (2013.01); *B01D 21/0075* (2013.01); *C02F 1/40* (2013.01)

(58) Field of Classification Search

CPC .............. B01D 17/045; B01D 17/0211; B01D 17/0214; B01D 21/0075; C02F 1/40

See application file for complete search history.

(56) References Cited

U.S. PATENT DOCUMENTS

| | | | |
|---|---|---|---|
| 3,899,427 | A | 8/1975 | Connelly |
| 3,977,977 | A | 8/1976 | Kall |
| 4,081,373 | A | 3/1978 | Rozniecki |
| 4,405,459 | A | 9/1983 | Smith |
| 4,526,691 | A | 7/1985 | Melis |
| 4,722,800 | A | 2/1988 | Aymong |
| 5,028,333 | A | 7/1991 | Wright |
| 5,068,035 | A | 11/1991 | Mohr |
| 5,443,724 | A | 8/1995 | Williamson et al. |
| 5,762,810 | A | 6/1998 | Pelton |

(Continued)

FOREIGN PATENT DOCUMENTS

| | | |
|---|---|---|
| CN | 101857286 | 10/2010 |
| CN | 104876298 | 9/2015 |

(Continued)

OTHER PUBLICATIONS

PCT International Search Report and Written Opinion in International Appln. No. PCT/US2021/071016, dated Nov. 3, 2021, 13 pages.

(Continued)

*Primary Examiner* — Liam Royce
(74) *Attorney, Agent, or Firm* — Dinsmore & Shohl LLP

(57) ABSTRACT

Coalescer plates, coalescer plate units, and coalescers, are provided. An exemplary embodiment provides a coalescer plate for separating a mixture of immiscible fluids. The coalescer plate comprises a pattern of wetting and non-wetting regions, wherein the pattern is based, at least in part, on phyllotaxis.

11 Claims, 25 Drawing Sheets

(56) References Cited

U.S. PATENT DOCUMENTS

| | | | | |
|---|---|---|---|---|
| 6,533,684 | B2 | 3/2003 | Winfield et al. | |
| 6,767,459 | B1 | 7/2004 | Sinker et al. | |
| 8,985,343 | B1 | 3/2015 | Mohr | |
| 10,627,170 | B2 | 4/2020 | Fioriti et al. | |
| 2004/0109981 | A1 * | 6/2004 | Lawrence | E03B 3/28 428/141 |
| 2006/0078724 | A1 | 4/2006 | Bhushan et al. | |
| 2006/0242933 | A1 | 11/2006 | Webb et al. | |
| 2007/0062887 | A1 | 3/2007 | Schwandt et al. | |
| 2007/0131235 | A1 | 6/2007 | Janikowski et al. | |
| 2008/0011693 | A1 | 1/2008 | Li et al. | |
| 2012/0292252 | A1 | 11/2012 | Chase et al. | |
| 2015/0004889 | A1 | 1/2015 | Seth | |
| 2015/0114903 | A1 | 4/2015 | Sivaramakrishnan et al. | |

FOREIGN PATENT DOCUMENTS

| | | |
|---|---|---|
| GB | 2374818 | 1/2005 |
| WO | WO 2010132785 | 11/2010 |
| WO | WO 2015143155 | 9/2015 |

OTHER PUBLICATIONS

Cummings et al., "A model of phyllotaxis," Journal of Theoretical Biology, 192, 531-544, 1998, 14 pages.

Davis, "Fibonacci Nos. for palm foliar spirals," Acta Botanica Neerlandica, 19(2), 249-256, Apr. 1970, 8 pages.

Dixon, "The mathematics and computer graphics of spirals in plants, " Leonardo, 16(2), 86-90, Spring 1983, 6 pages.

Erickson, "Tubular packing of spheres in biological fine structure," Science, 181(4101), 705-716, Aug. 1973, 12 pages.

Ferry, "The phyllotaxis of the date palm," Proc. Inter. Conf. on Date Palms, (pp. 559-571). Al-Ain, UAE, 1998, 13 pages.

Fowler et al., "Modelling spiral phyllotaxis," Computers & Graphics, 13(3), 291-296, 1989, 6 pages.

Han et al., "Review of the recent advances in design of corrugated plate packs applied for oil-water separation," Journal of Industrial and Engineering Chemistry, 53, 37-50, 2017, 57 pages.

* cited by examiner

500

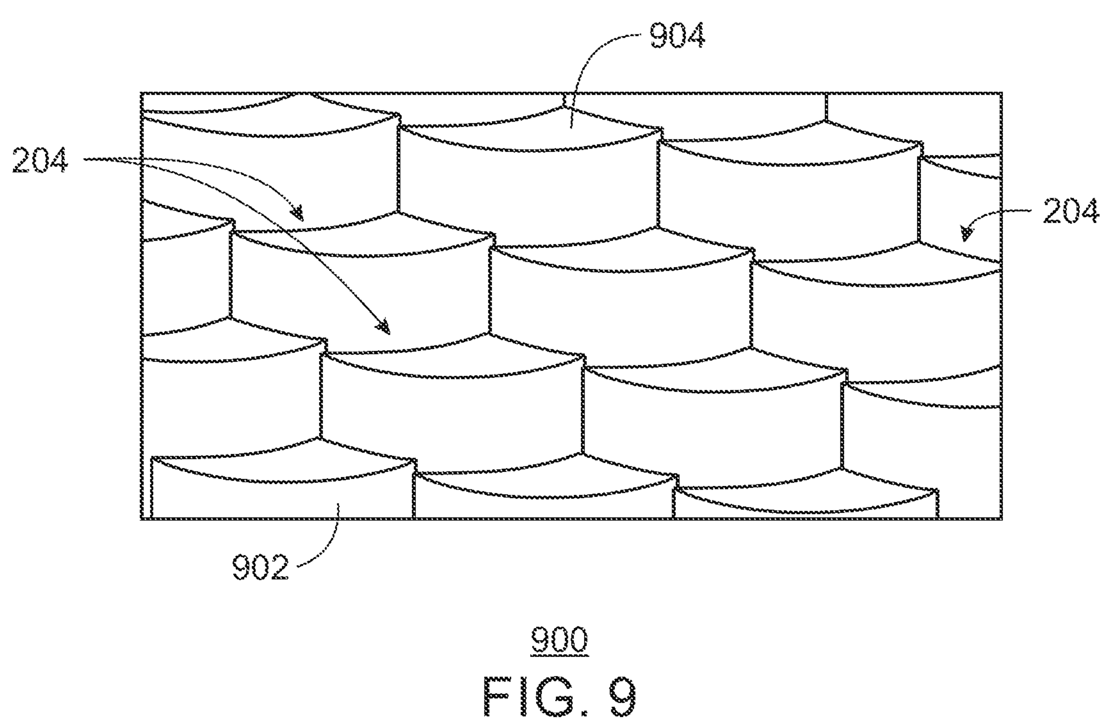
FIG. 9
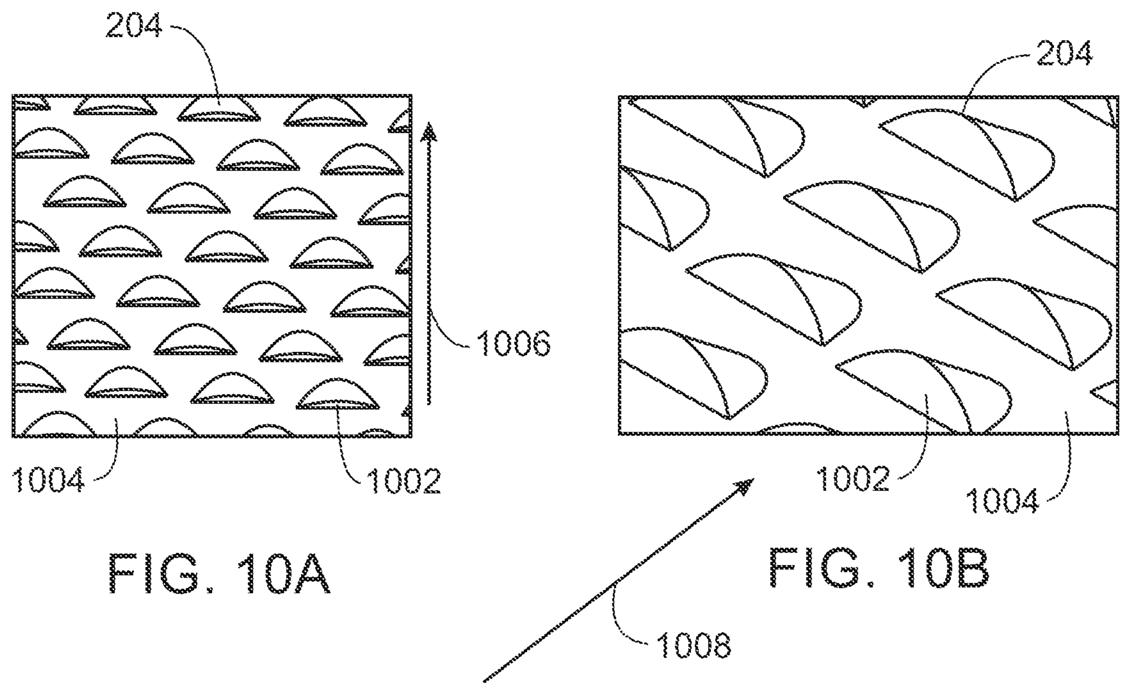
FIG. 10A
FIG. 10B

1700

1900

2000

2100

COALESCER PLATE WITH PHYLLOTAXIS-DERIVED PATTERN

TECHNICAL FIELD

The present disclosure is directed to coalescer plates.

BACKGROUND

Parallel plate coalescing media are used in oil-water separator vessels in the oil and gas industry to treat and remove contaminant oil from produced water, or to remove dispersed water from wet crude oil, resulting from oil production. Produced water contains a contamination of the oil phase dispersed in the water phase and the parallel plate coalescer causes oil droplet coalescence and aggregation that increases the separation and recovery of the dispersed oil from the produced water flow. Wet crude oil contains a contamination of the water phase dispersed in the oil phase and the parallel plate coalescer causes water droplet coalescence and aggregation that increases the separation and recovery of the dispersed water from the wet crude oil. The coalesced and aggregated oil droplets, or water droplets, are concentrated at the parallel plate walls away from the produced water, or wet crude oil flow. This allows the oil to rise, or water to settle, guided by the parallel plates to the water surface where the oil can be concentrated and skimmed off with the aggregated oil and removed, or to water-oil interface where the water is withdrawn with the coalesced or free water.

SUMMARY

An embodiment described herein provides a coalescer plate for separating a mixture of immiscible fluids. The coalescer plate includes a pattern of wetting and non-wetting regions, wherein the pattern is based, at least in part, on phyllotaxis.

Another embodiment described herein provides a coalescer plate assembly. The coalescer plate assembly includes a plurality of coalescer plates, wherein each coalescer plate includes a pattern of wetting and non-wetting regions based, at least in part, on phyllotaxis. The plurality of coalescer plates is assembled into a stack with a uniform distance between each of the coalescer plates.

Another embodiment described herein provides a coalescer including a coalescer plate, where the coalescer plate includes a pattern of wetting and non-wetting regions, wherein the pattern is based, at least in part, on phyllotaxis.

BRIEF DESCRIPTION OF DRAWINGS

FIG. 9 is a drawing of overlapping protrusions in a close-packed arrangement on a planar surface based on the node pattern in FIG. 3.

FIGS. 10A and 10B are drawings of a sparse array of non-overlapping protrusions.

DETAILED DESCRIPTION

Figure 1:
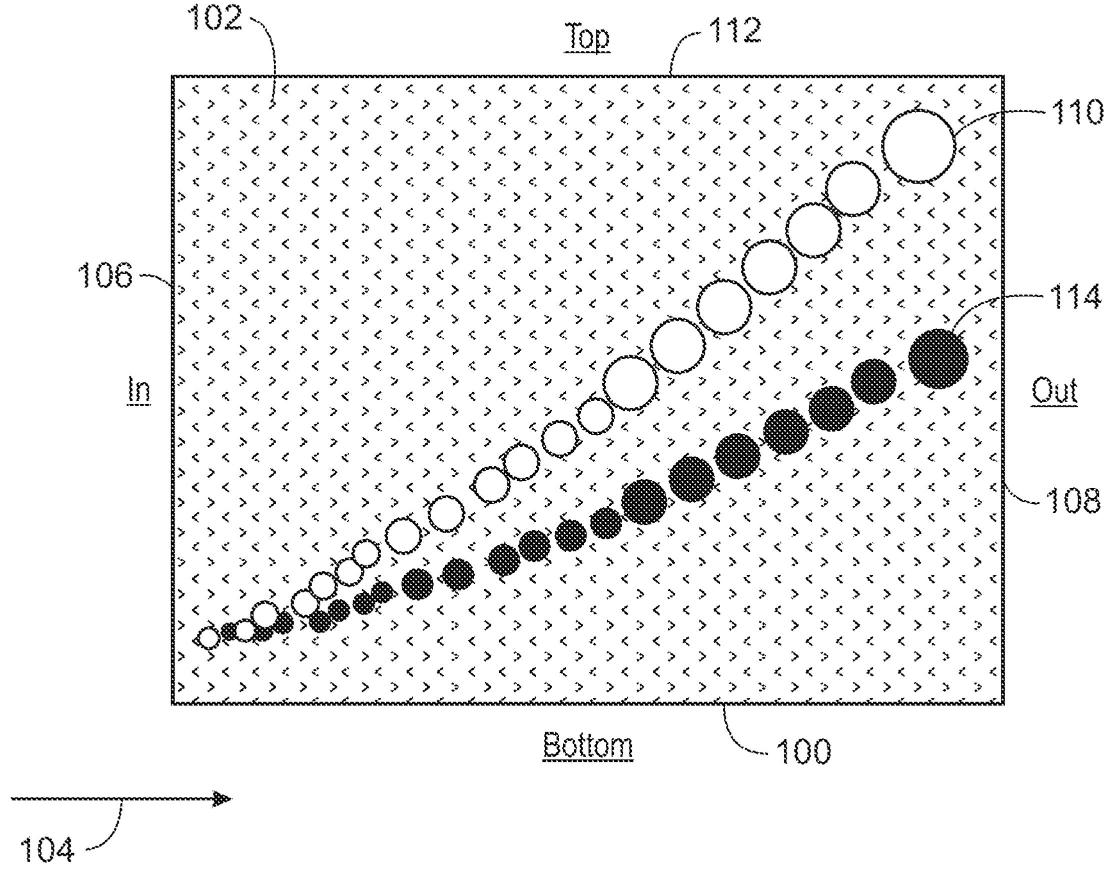
FIG. 1 is a schematic drawing of a plate used for separating oil droplets dispersed in water

Embodiments described herein relate to the design of coalescer plates used in the coalescing media of parallel plate coalescers, coalescing plate packs, and coalescing plate assemblies. An embodiment includes a coalescing plate that is used to coalesce and aggregate droplets of a liquid that are dispersed in a continuous phase of an immiscible material, for example, dispersed oil droplets transported in a continuous water phase, or water droplets transported in a continuous oil phase.

The coalescing plates are flat or corrugated plates with node or line patterns formed from alternating non-wetting and wetting regions. As used herein, non-wetting and wetting are defined relative to the phase of the entrained droplets. For example, for entrained droplets of oil in a water continuous phase, the wetting region is oleophilic and the non-wetting region is oleophobic. Similarly, for entrained droplets of water in an oil continuous phase, the wetting region is hydrophilic and the non-wetting region is hydrophobic. The patterns used herein are described by phyllotaxis, such as a spiral pattern phyllotaxis defined by the Fibonacci series. Other patterns based on phyllotaxis may be used, including a Lucas spiral, an anomalous spiral, a bijugate, a multijugate, a tricussate, or a whorled pattern. The pattern enhances the coalescence of the droplets from the incompatible phase, improving the separation. In various embodiments, the patterned coalescing plate is assembled in a parallel plate coalescer that is placed inside a separator vessel, or coalescer, that is used to separate a contaminant oil, or water, from a produced water, or wet crude oil stream.

Phyllotaxis is the study of the arrangements or patterns of leaves or flowers on a plant stem occurring in nature. For leaves, the patterns evolved to ensure each leaf receives a maximum amount of direct sunlight and precipitation at the leaf bud base without substantial direct obstruction or overlap from other leaves or branches. In embodiments described herein, the patterns used for coalescer plates are based on phyllotaxis to improve the efficiency of liquid-liquid coalescer plates. The pattern causes the coalesced liquid droplets or film on the plate to move in a non-linear direction, differently from what would occur if the plates were non-textured. When the plates are arranged in parallel in an assembly of multiple plates with a uniform separation between them, the patterns enhance coalescence of the dispersed droplet phase by reducing the distance to settle or to fall or to sediment, or rise or to cream.

The pattern guides the coalescing droplets during settling or rising, enhancing coalescence by increasing the capture and collection of passing droplets. The pattern also provides the means to channel the coalesced liquid, as each successive rank of nodes is offset in the axial and transverse directions. As used herein, a node is a location on the plate or a junction between two intersecting grooves or corrugations or strips or lines on the surfaces with a different degree of wettability of the dispersed phase.

In some embodiments, the pattern has a natural arrangement that has no overlap between successive node ranks. This characteristic is exploited for the textured design or pattern of a coalescer plate to promote a bias in the lateral transport or movement of a coalesced phase, such as oil or water, on the coalescer plate thereby directing the coalesce and promoting aggregation of the oil towards the top edge, or water towards the bottom edge, of the coalescer plate sooner than if the plate were flat and not textured.

The coalescing plates are assembled as parallel plates in a plate pack assembly and the assembly is placed in a coalescer, or multiphase separator, and immersed in the liquid flow, such as the oil-water or water-oil flow. The plates described herein may also be used in gas-liquid processes where an assembly of parallel plates are used to contact or condense dispersed liquid droplets to remove a liquid from a bulk gas stream, such as in a fog, mist, or other gas streams. For example, the liquid droplets of water in a gas, such as fog or mist, deposit on the plate. The pattern of wetting and non-wetting surfaces facilitates the aggregation of the droplets enhancing condensation and collection of the water.

The patterned coalescer plates described herein enhance the dispersed phase coalescence process by increasing the film thickness, thereby reducing the effective deposition distance for a droplet separating from the bulk flow. In some embodiments, texturing the surface with patterns that incorporate a natural bias or dispersion based on irrational numbers provides a non-linear and non-blocking pattern that reduces the effective axial/forward distance to achieve more dewatering or deoiling at a given throughput.

FIG. 1 is a schematic drawing of a plate 100 used for separating oil droplets dispersed in water. The plate 100 is viewed from below. The plate 100 may be textured with a pattern 102 of wetting and non-wetting regions, for example, based on phyllotaxis. During flow 104 from the inlet 106 to the outlet 108 across the plate 100, the pattern 102 causes the movement of oil droplets 110 on the plate to be dispersed towards the top 112 of the plate 100. By comparison, oil droplets 114 on a smooth plate would be deflected more to the outlet 108. The direction of the dispersion effect is reversed for water droplets settling in oil.

Wetting and Non-Wetting Coalescer Plate Surface

The techniques to produce wetting or non-wetting surfaces use surface treatments, coatings, or material selection, among others. As described herein, surface wettability is in reference to the dispersed phase, such as oil droplets in water, or water droplets in oil. The surface wettability is described by the contact angle between the oil, water and solid surface. The wettability profile of a solid is known from the surface free energy and can be measured from the contact angle measurements. Wettability is known to affect coalescer media performance. Non-wetting surfaces have a contact angle equal to or greater than 90°. A wetting surface has a contact angle less than 90°.

The coalescer plates can be fabricated from suitable materials such as metals, for instance stainless steel, duplex steel, and the like, or polymeric materials, such as polypropylene, and the like. In addition to material selections, the surface texture or degree of roughness may be adjusted to affect the wettability of a solid surface. The scale of roughness is microscopic.

Coalescence is improved and thus oil, or water, removal efficiency increases when the coalescer plate assembly combines collision coalescence, with a combination of wetting and non-wetting surfaces. The collision coalescence is adjusted by changing the trajectory of the dispersed phase through modification of the flow field using corrugation or protrusions or obstacles. The combination of wetting and non-wetting areas on a coalescer plate improves coalescence performance.

Pattern Definition

Figure 2:
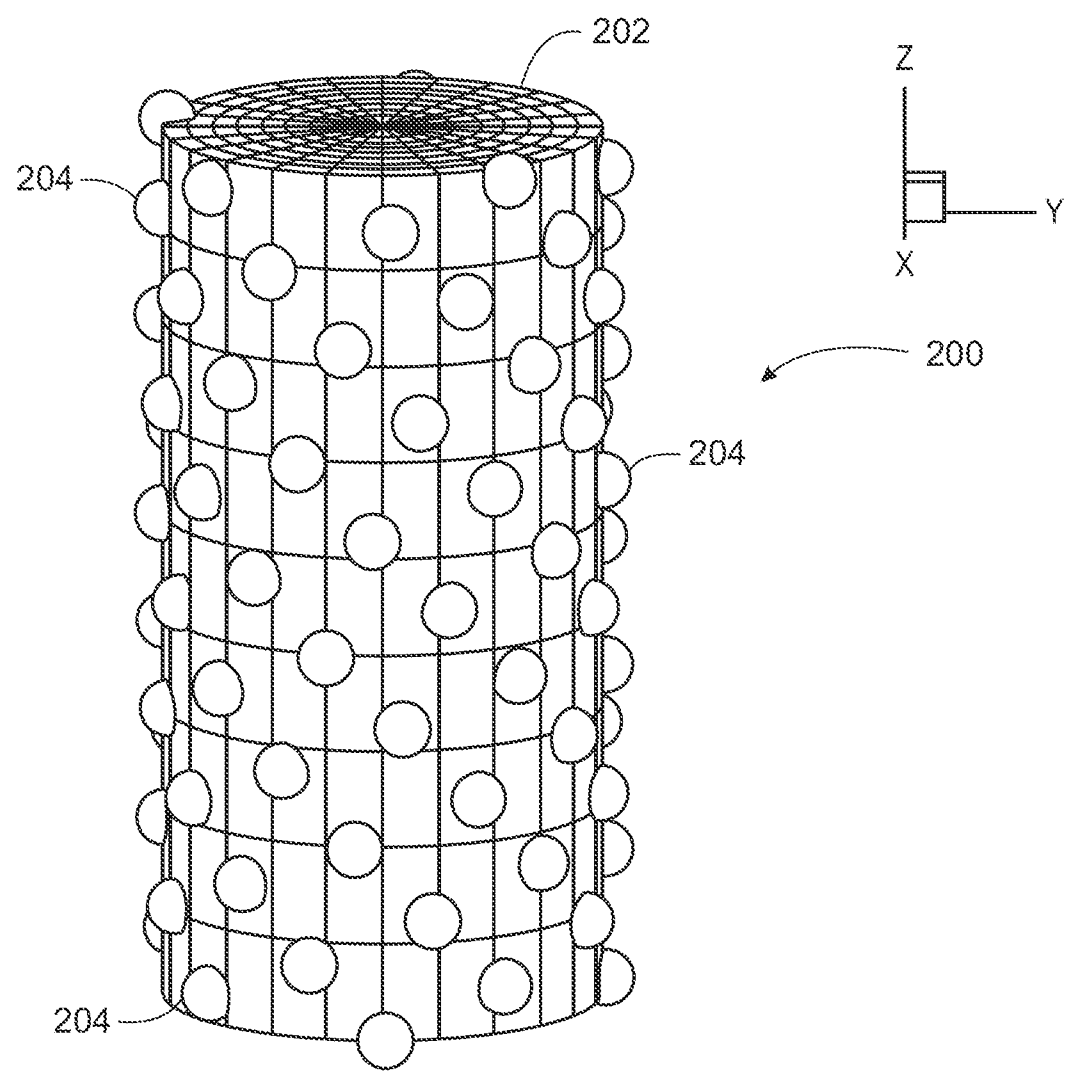
FIG. 2 is a drawing of a phyllotaxis pattern on a cylindrical surface (h=+1), such as a tree trunk

FIG. 2 is a drawing of a phyllotaxis pattern 200 on a cylindrical surface 202 (h=+1), such as a tree trunk. In spiral phyllotaxis, the angle between two consecutive nodes 204, such as leaf buds, is the divergence angle. As described herein, consecutive nodes are defined in terms of the spiral, but are not adjacent on the trunk. Thus adjacent are separated by Fibonacci numbers, such as 3, 5, 8 and 13. In can be noted that not all of the nodes 204 are labeled, in order to simplify the figure. The visible helices formed by the nodes 204 on the cylindrical surface 202 of the tree are the parastichies, and are related to the golden ratio ($\tau=(1+\sqrt{5})/2$). For a date palm, the parastichies are consecutive numbers in the Fibonacci series of 3, 5, 8 and 13. The positions of leaf buds, or nodes 204, may be translated from the cylindrical domain, such as a tree trunk, in FIG. 2 to a planar domain, as shown in FIG. 3.

Figure 3:
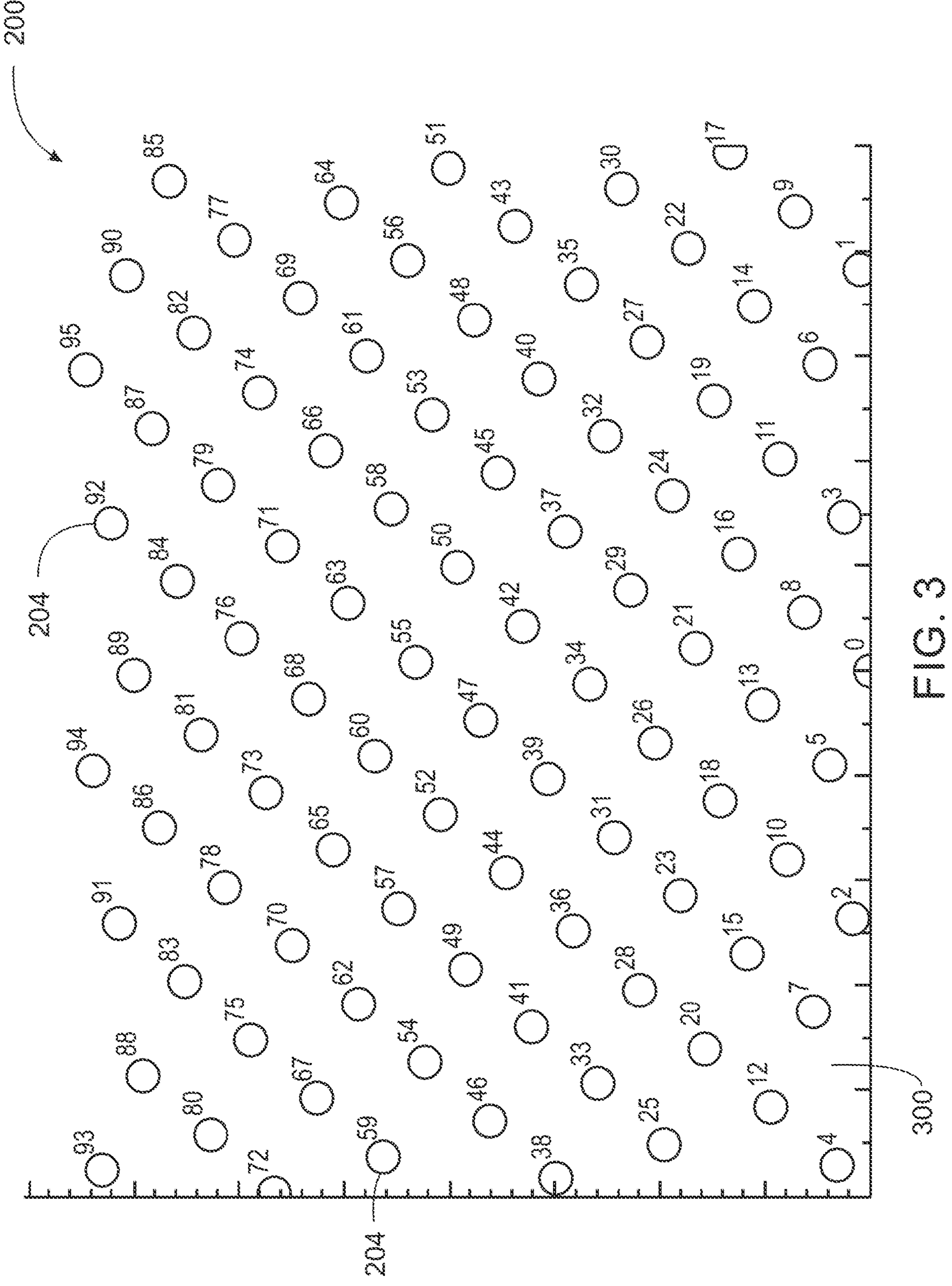
FIG. 3 is a drawing of the phyllotaxis pattern projected on a planar surface.

FIG. 3 is a drawing of the phyllotaxis pattern 200 projected on a planar surface 300. Like numbered items are as described with respect to FIG. 2. The numbering of the nodes 204 in FIG. 3 represent the order of the nodes in the spiral phyllotaxis. The distribution of the nodes 204, i.e., the pattern 200, is not a regular square or rectangular array, instead, the lattice pattern is quadrilateral in structure. As used herein, a rhombic structures has equidistance sides, and thus, the pattern displayed in FIG. 3 is a rhombic structure. However, the equations can change the lattice structure to non-rhombic if the z direction factor C is changed, as described herein.

The angle of consecutive nodes is $\theta_{i+1}=\theta_i+h\cdot\tau$, where h is +1 or −1, controlling the pattern direction or handedness, and $\tau$ is in radians. The x- and y-positions on the cylindrical surface of radius r are:

$$x_i=r\cdot\cos\,\theta_i;\text{ and}$$

$$y_i=r\cdot\sin\,\theta_i.$$

The angle between consecutive nodes on the planar surface is $$\varphi_i=a\,\tan(y_i/x_i),$$

where $$\varphi_i-\varphi_{i-1}=\frac{2\pi}{\tau^2}=2.3999632$$

radians or the well-known "Golden Angle" of 137.5077641°.

The horizontal node position is converted from radians to length units by factoring the trunk radius r:

$$x_i'=r\cdot\frac{\varphi_i}{\pi},$$

where $-r<x_i'<r$. The vertical node position $z_i$ is:

$$z_i=C\frac{2}{\sqrt{\tau}}+z_{i-1},$$

where C is an adjustable coefficient equivalent to a growth rate factor. Adjusting the parameter C controls the spacing in the z-direction to expand or compress the pattern relative to the transverse direction $\varphi_i$ or $x_i'$.

Effect of Handedness

Figures 4A, 4B:
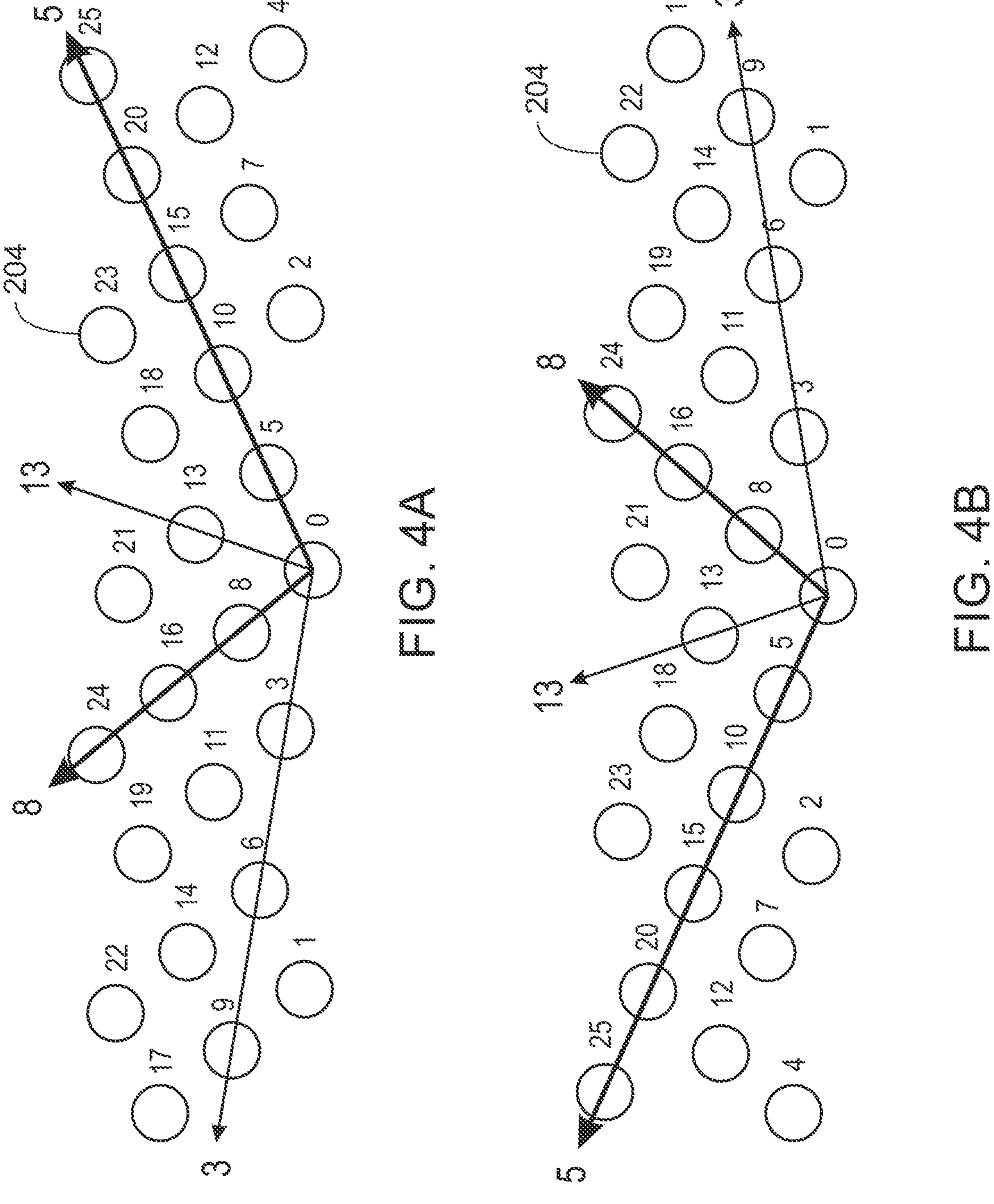
FIGS. 4A and 4B are drawings showing the effects of handedness on the pattern with the directions of the spiral phyllotaxis.

FIGS. 4A and 4B are drawings showing the effects of handedness on the pattern with the directions of the spiral phyllotaxis. Like numbered items are as described with respect to FIG. 2. The nodes 204 are numbered sequentially, and the 3, 5, 8, and 13 parastichies are labeled. FIG. 4A shows a right handed spiral in which h=1. FIG. 4B shows a left handed spiral in which h=−1. The parastichy is seen as the difference or reflection in the node numbers along each spiral.

Pattern 2 Definition

Figure 5:
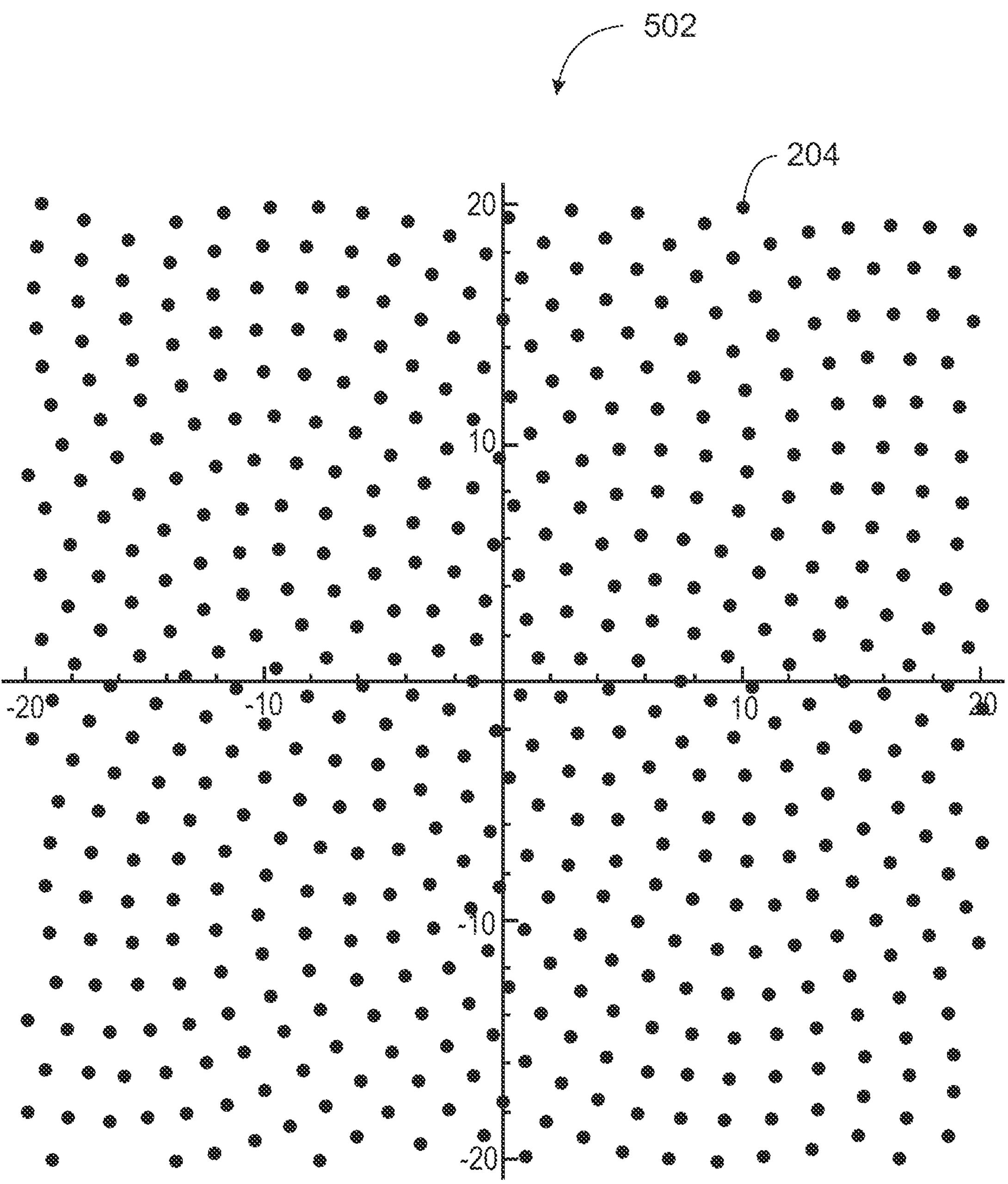
FIG. 5 is a plot of nodes depicting a second phyllotaxis pattern.

FIG. 5 is a plot 500 of nodes 204 depicting a second phyllotaxis pattern 502. Like numbered items are as described with respect to FIG. 2. Another way to look at spiral patterns, such as palm trees, is to look at it from the top, such as the apex of a tree. If the pattern is flattened from the top and scale the pattern depending on the distance from the center, the pattern would look like FIG. 5. The pattern is defined by the following equations:

$$x_i=\sqrt{i}\,.\,\sin(ig),\ y_i=\sqrt{i}\,.\,\cos(ig),\text{ where } i=1,2,\ldots\text{ and } g=\frac{2\pi}{\tau^2}.$$

Alternating Non-Wetting or Wetting Surfaces

In some embodiments described herein, phyllotaxis is used to define a pattern on a surface of a coalescer plate, such as the structure described below. The pattern is used to define alternating regions, or areas of the coalescer plate, that are non-wetting and wetting. As described herein, wetting and non-wetting are expressed with respect to the phase of the entrained droplets. For example, for droplets of oil in water, the wetting surface is oleophilic to the dispersed entrained oil phase, while for droplets of water in oil, the wetting surface is hydrophobic.

Wetting promotes droplet attachment of the droplets of the dispersed phase to the plate, the coalescence of droplets to form larger droplets, and a buildup of a film. Non-wetting reduces the contact area between the continuous phase and the coalescer plate, and reduces the resistance to movement of droplets of the dispersed phase along the coalescer surface by reducing the apparent droplet stickiness. The pattern of wetting and non-wetting regions also causes a scouring action of the film, promoting clearing of the coalesced dispersed phase from the coalescer plate and making it easier to clean off any accumulated hydrocarbon substances from the coalescer plates during periodic vessel maintenance.

Wetting Nodes

In some embodiments, the pattern of FIG. 5 defines the positions or locations of nodes or intersections between protrusions, grooves, corrugations or strips. By adjusting the parameter C, the spacing in the z-direction can be expanded or compressed. The node spacing is expanded or compressed to decrease or increase the texture density. By adjusting the parameter trunk radius r controls the number of nodes per unit area of the plate. The texture density is dependent on the number of nodes per unit area of the plate, and the projected area of the nodes relative to the area of the plate. The projected area of the nodes is relative to the area of the plate, termed node area fraction herein, is between about 0.05 and 0.7.

The texture density is selected based on the mean dispersed droplet size, the dispersed phase droplet size distribution and the dispersed phase concentration, among other factor. For example, in some embodiments having a low dispersed phase concentration, such as oil-in-water concentrations of 0.01% to 1%, the node area fraction is higher. In some embodiments having a high dispersed phase concentration, such as water-in-oil concentrations of 10 to 50%, the node area fraction is lower. In these embodiments, the node diameter, for a circular node, is between about 0.1 and 100 mm, or about 0.1 mm, about 1 mm, about 10 mm, or about 100 mm. For 1 mm nodes, the node diameter can be 100 times the coalescing droplet size. The intra-node spacing is controlled by combining the node diameter with the area of nodes relative the plate area. The nodes are spaced sufficiently far apart to delay the coalescence of droplets adhering to adjacent nodes to maximize the droplet height. The area of the nodes can be increased relative to the area between nodes, as illustrated in FIGS. 6A-6C and FIG. 7. In these figures, the nodes are wetting and the background plate surface is non-wetting and the node diameter can be 0.1 mm, 1 mm, 5 mm or 10 mm.

Figures 6A, 6B, 6C:
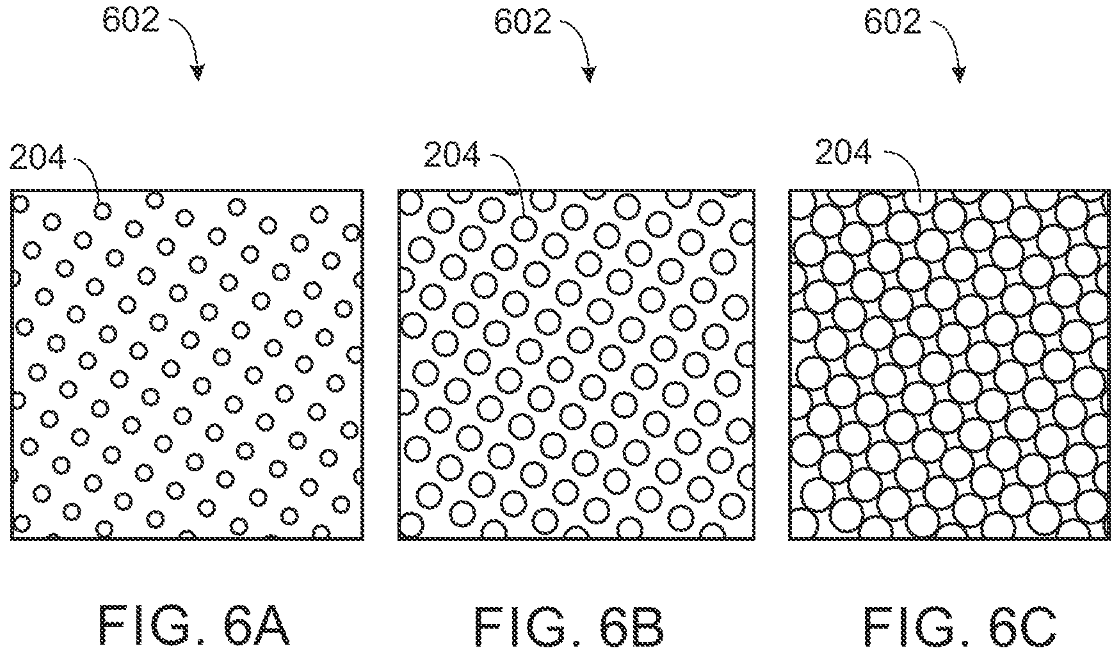
FIGS. 6A, 6B, and 6C are drawings of node patterns with varying node area density and h=−1.
Figure 7:
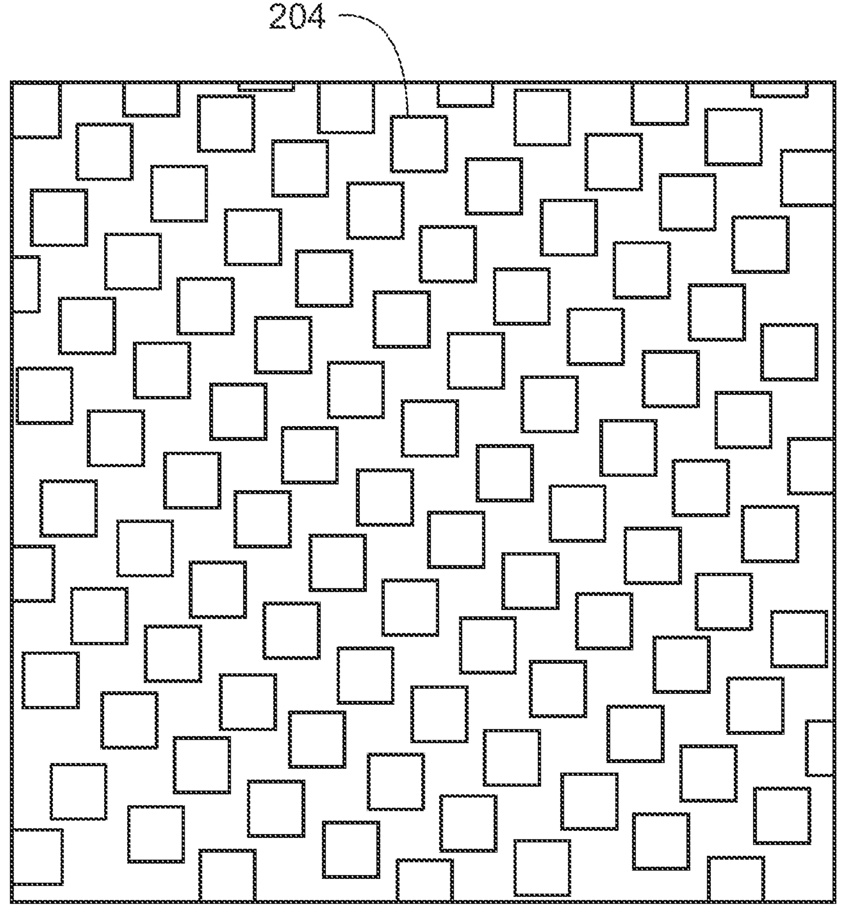
FIG. 7 is a drawing of nodes that are square or rectangular in shape with h=−1.

FIGS. 6A-6C are drawings of node patterns 602 with varying node area density and h=−1. Like numbered items are as described with respect to FIG. 2. As shown in these figures, the nodes 204 may be increased in size to change the separation parameters. The nodes can be separated or in contact or overlapping. Further, the node shape can be circular, square, rectangular, rhombic, a parallelogram, triangular or arbitrary. FIG. 7 is a drawing of nodes 204 that are square or rectangular in shape with h=−1.

Figure 8A:
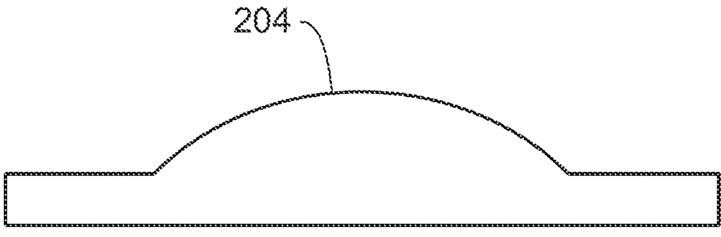
FIG. 8A is a cross-section of a coalescer plate with a node having a dimpled profile.
Figure 8B:
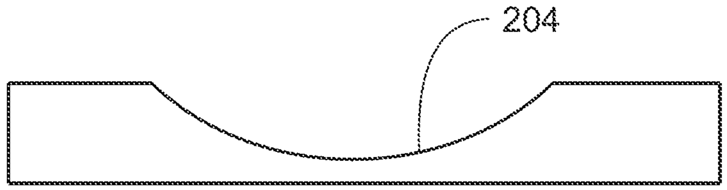
FIG. 8B is a cross-section of a coalescer plate with a node having a recessed profile.

The wetting node areas on the coalescer plate surface can protrude or be dimpled/recessed as shown in FIGS. 8A and 8B. Like numbered items are as described with respect to FIG. 2. FIG. 8A is a cross-section of a coalescer plate with a node 204 having a raised or protruded profile. FIG. 8B is a cross-section of a coalescer plate with a node 204 having a dimpled/recessed profile. For these arrangements, the protruded or dimpled/recessed node may be wetting in relation to the other regions of the plate.

As described herein, the region represented by the nodes are wetting with respect to the dispersed phase. The open area around the nodes is non-wetting. The wetting surface of the nodes capture and coalesce droplets. The droplets grow in size extending further into the flow field than if the entire surface were wetting. By extending further into the flow field, more droplets are captured by the coalesced liquid wetting the plate. The non-wetting regions of the plate allow droplets to roll and collide until getting captured by a wetting node.

The location of the nodes is determined by the type of droplets and continuous phase to be separated. Specifically, the nodes are required on the coalescing surface of the plate. For oil droplets in water, the nodes are on a bottom surface of an upper plate, and for water droplets in oil the nodes are on the top surface of a lower plate.

Protrusions

FIG. 9 is a drawing 900 of overlapping protrusions in a close-packed arrangement on a planar surface based on the node pattern in FIG. 3. Like numbered items are as described with respect to FIG. 2. In some embodiments, the protrusions are arranged in a phyllotaxis pattern. In the drawing 900, the protrusions are truncated cylinders that are functioning as the nodes 204. A truncated cylinder shape is used to replicate a structure similar to palm tree leaf buds on a planar surface. The close spacing between the nodes 204 relative to the scale of the truncated cylinder creates an overlapping array of the protrusions as shown in FIG. 9. The area represented by the curved surface 902 of the front of the protrusions is either non-wetting or wetting. In FIG. 9, the planar surface 904 around the protrusions is either wetting or non-wetting. When the protrusions are overlapping, as in FIG. 9, the curved surface 902 is either non-wetting or wetting while the planar surface 904 is either wetting or non-wetting. By adjusting the parameter C, the spacing in the z-direction can be expanded or compressed to decrease or increase the texture density.

FIGS. 10A and 10B are drawings of a sparse array of non-overlapping protrusions. Like numbered items are as described with respect to FIG. 2. In these embodiments, the spacing of the nodes 204 is expanded to decrease the texture density node area per unit area of plate. As described herein, the texture density is dependent on the number of nodes per unit area of the plate, and the area of the nodes relative to the area of the plate. The area of the nodes relative to the area of the plate ranges between 0.05 and 0.7. The texture density is selected based on the mean dispersed droplet size, the dispersed phase size distribution and the dispersed phase concentration.

As for FIG. 9, in FIGS. 10A and 10B, the protrusions have wetting surfaces 1002 with the area 1004 in between being non-wetting. However, the area represented by the protrusions may be either non-wetting or wetting. As for FIG. 9, FIG. 10A and FIG. 10B, the area 1004 around the protrusions or node 204 may be either wetting or non-wetting, while the nodes 204 may be non-wetting or wetting. When the protrusions are overlapping, as shown in FIG. 9, the curved surface 902 is either non-wetting or wetting while the planar surface 904 is either wetting or non-wetting. The dispersed droplets wet and grow on the wetting regions. When the protrusions are oriented at an angle into the primary bulk flow direction, for example, bottom to top in FIG. 10A (as indicated by arrow 1006) or lower left to upper right in FIG. 10B (as indicated by arrow 1008), the protrusions cause an acceleration of the fluids between the protrusions and create a low pressure region with fluid recirculation downstream of the protrusion. This increases the probability of droplet collision with the wetting surface thereby increasing capture relative to a planar surface. In addition to the truncated cylinders of FIGS. 9, 10A, and 10B, any number of shapes may be used for the protrusions for the coalescer plate.

Figure 11:
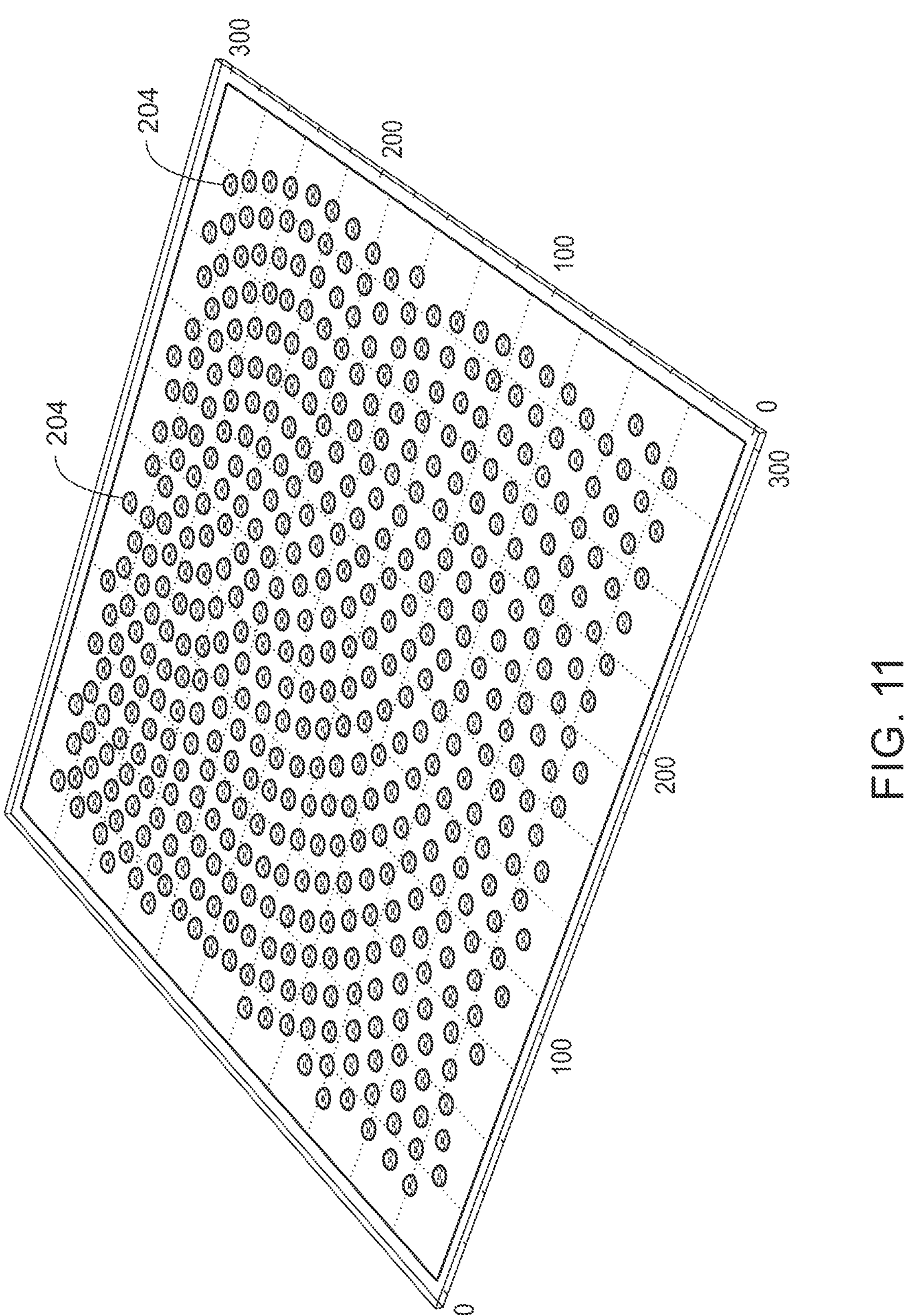
FIG. 11 is a drawing of bump shaped protrusions arranged on a planar surface, based on the pattern of FIG. 5.

FIG. 11 is a drawing of bump shaped protrusions arranged on a planar surface, based on the pattern of FIG. 5. Like numbered items are as described with respect to FIG. 2. The bump protrusions act as the nodes 204 and are arranged on a planar surface based on the node pattern in FIG. 5. The pattern has no straight-line handedness and is an alternate way to catch droplets while they move on the surface. Any number of shapes may be used for the protrusions for the coalescer plate.

Line Patterns—Grooves and Strips

Figure 12:
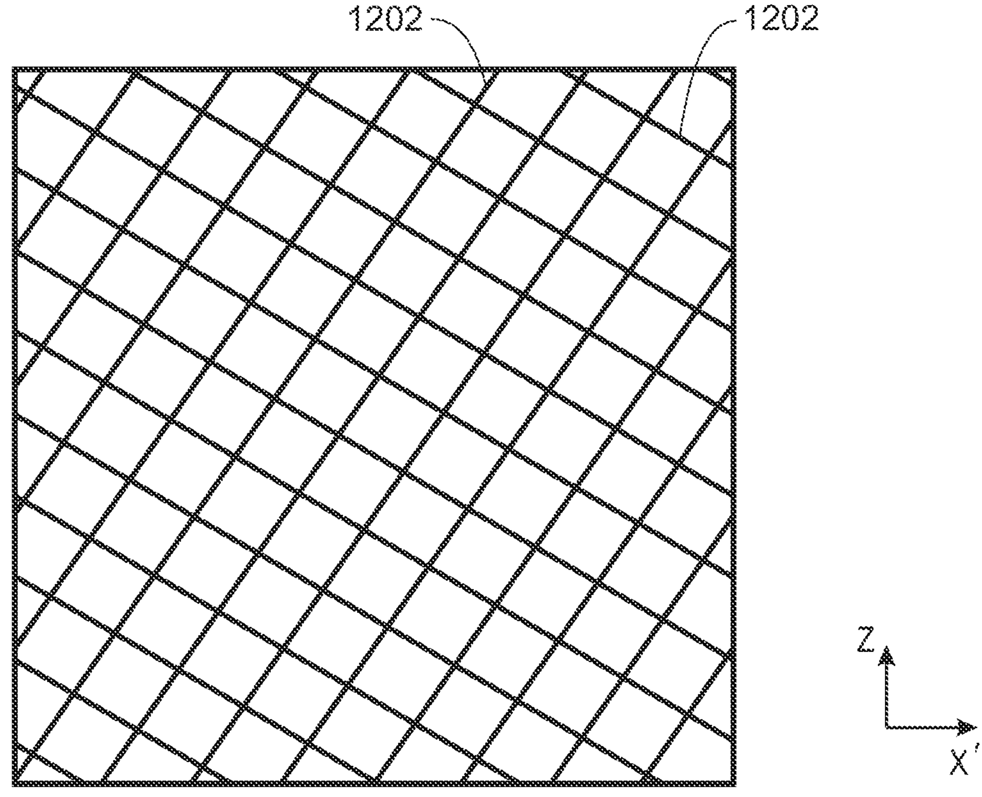
FIG. 12 is a drawing of a pattern of lines on the coalescer plate with h=−1.
Figure 13:
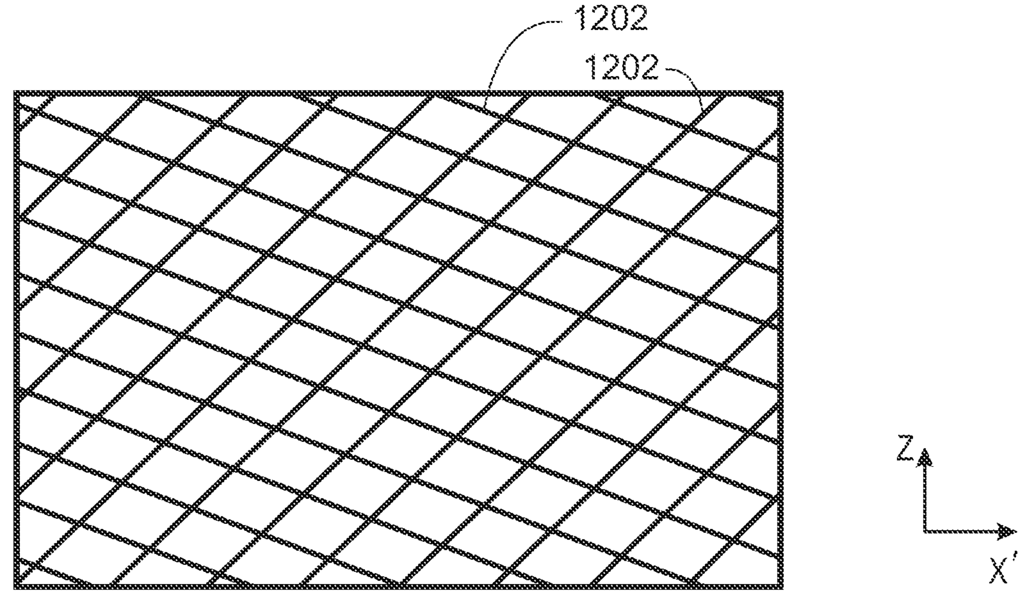
FIG. 13 is a drawing of a pattern of lines on the coalescer plate with h=−1, and a reduced value for C.

The patterns on the coalescer plates are not limited to bump shaped protrusions, or discrete, nodes 204, but may use other shapes such as line patterns. FIG. 12 is a drawing of a pattern of lines 1202 on the coalescer plate with h=−1. FIG. 13 is a drawing of a pattern of lines 1202 on the coalescer plate with h=−1, and a reduced value for C.

By connecting the spatial node locations, a pattern of lines 1202 arrayed with the phyllotaxis pattern is created on the plate surface as illustrated in FIG. 12. By adjusting the parameter C, the spacing of the lines 1202 in the z-direction can be expanded or compressed as shown in FIG. 13. The spacing is adjusted to decrease or increase the texture density. The texture density is dependent on the number and width of lines per unit area of the plate, and the area of the lines relative to the area of the plate. The area of the lines relative to the area of the plate ranges between 0.05 and 0.7, or between about 0.1 and 0.5, or between about 0.2 and 0.4. The texture density is selected based on the mean dispersed droplet size, the dispersed phase droplet size distribution and the dispersed phase concentration, as described with respect to the nodes. In some embodiments, the texture density is selected based on the mean dispersed droplet size, the dispersed phase droplet size distribution and the dispersed phase concentration.

Figure 14A:
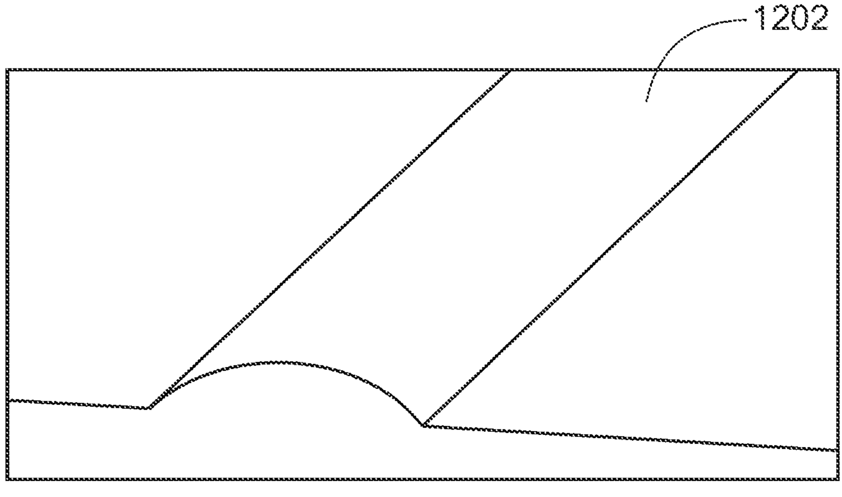
FIGS. 14A and 14B are drawings of protruding lines and recessed lines, respectively.
Figure 14B:
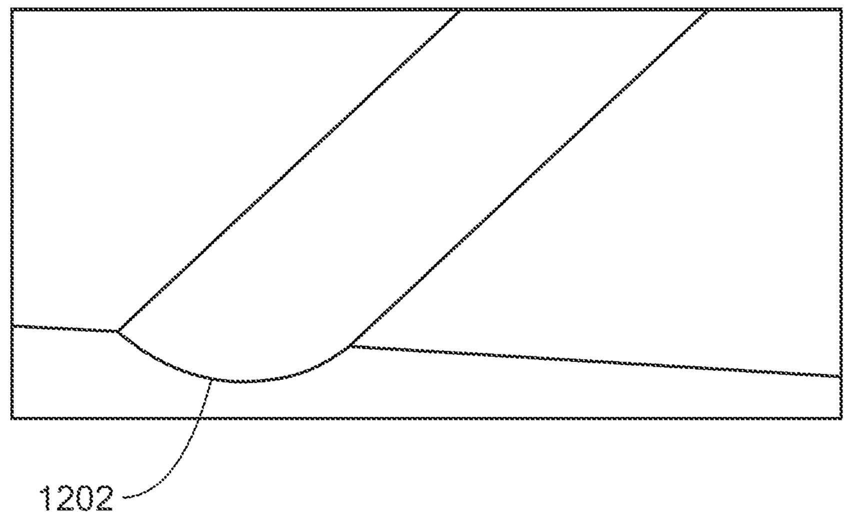

The line 1202 have a physical width and can be planar as strips, or contoured positively (raised) or negatively (recessed) as described with respect to FIGS. 8A and 8B. FIGS. 14A and 14B are drawings of protruding lines and recessed lines, respectively. Like numbered items are just described with respect to FIG. 12. As for the line patterns, adjustment of the parameter C can be used to modify the spacing in the z-direction to change the texture density.

Figure 15A:
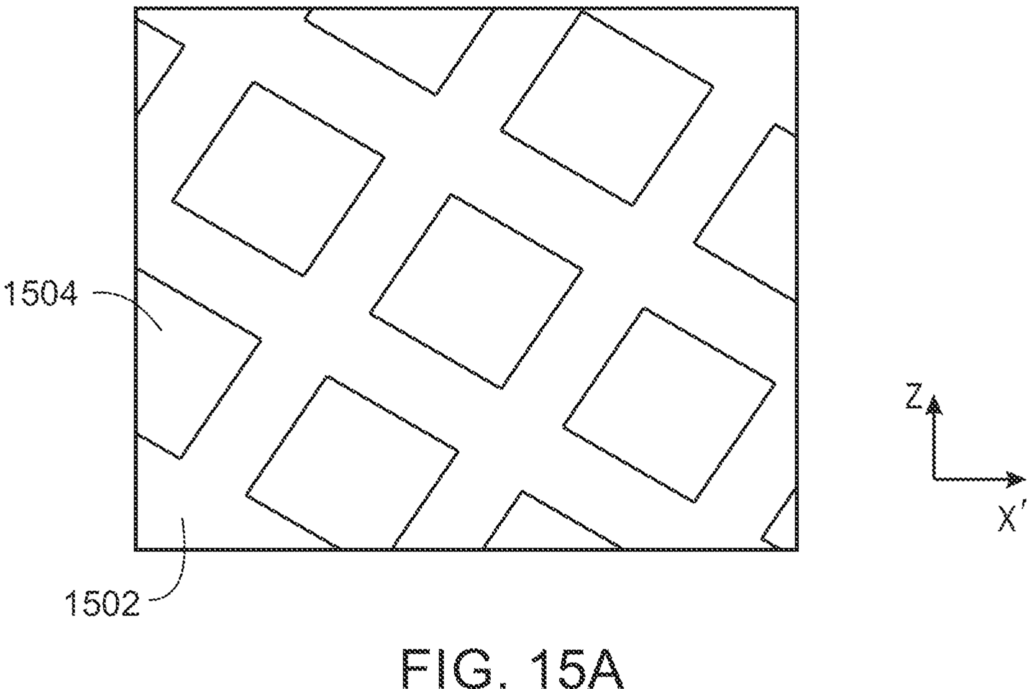
FIGS. 15A and 15B are alternating wetting/non-wetting patterns with different values of C.
Figure 15B:
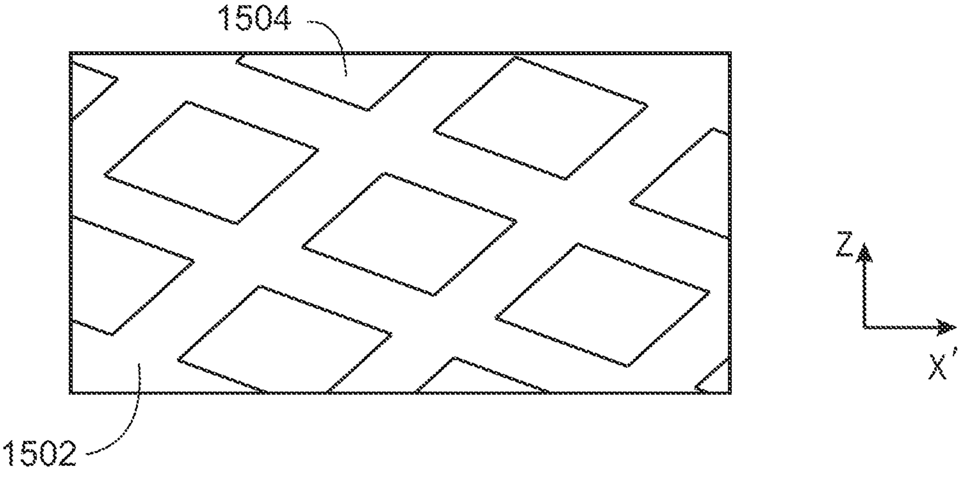

FIGS. 15A and 15B are alternating wetting/non-wetting patterns with different values of C. In FIGS. 15A and 15B, the area represented by the strips 1502 is either non-wetting or wetting, while the open area 1504, bounded by the line intersections is either wetting or non-wetting.

As for the planar configuration illustrated in FIG. 12, the successive line intersections show a primary direction that is not parallel with the direction of flow but drifts in the negative x'-direction as the value of z increases. When a droplet contacts the non-wetting area on the plate, the droplet does not travel straight up the plate as in a flat non-textured plate but instead travels up the plate and is directed by the pattern to the left or the right depending on the handedness h of the pattern. Further, the line pattern is used on the coalescing surface of the plate. For example, for oil droplets in water, the line pattern is on the bottom surface of an upper plate, and for water droplets in oil, the line pattern is on the top surface of the lower plate.

Figure 16:
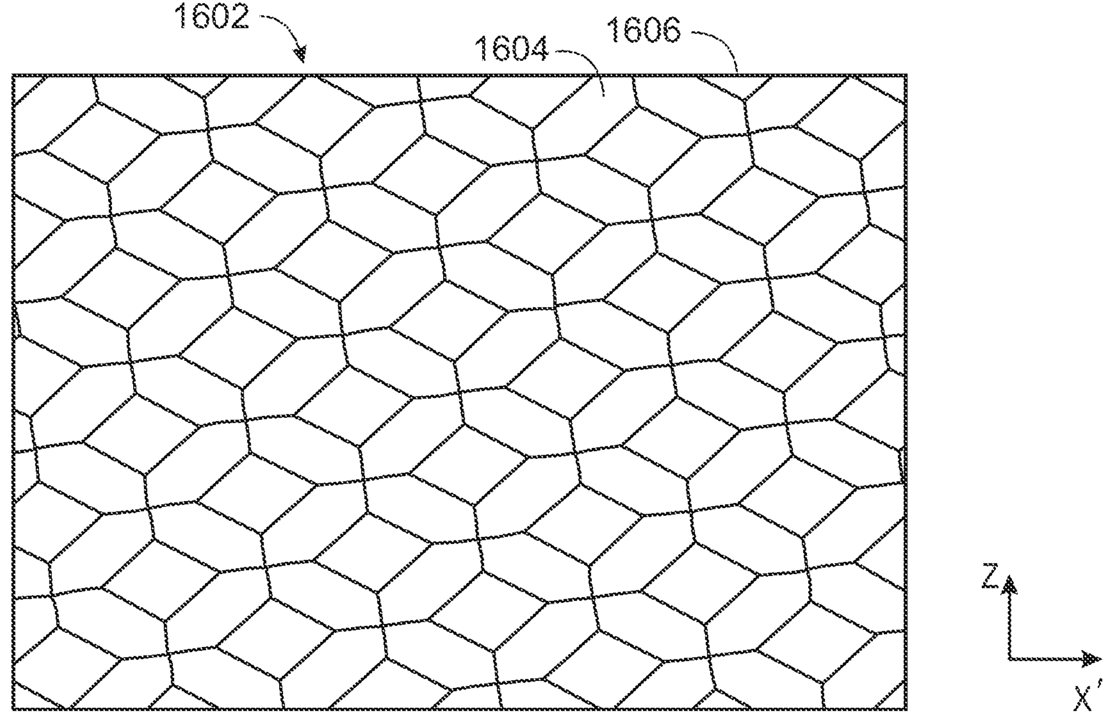
FIG. 16 is a drawing of a coalescer plate having corrugation with alternating wetting and non-wetting surfaces based on a phyllotaxis pattern.
Figure 17:
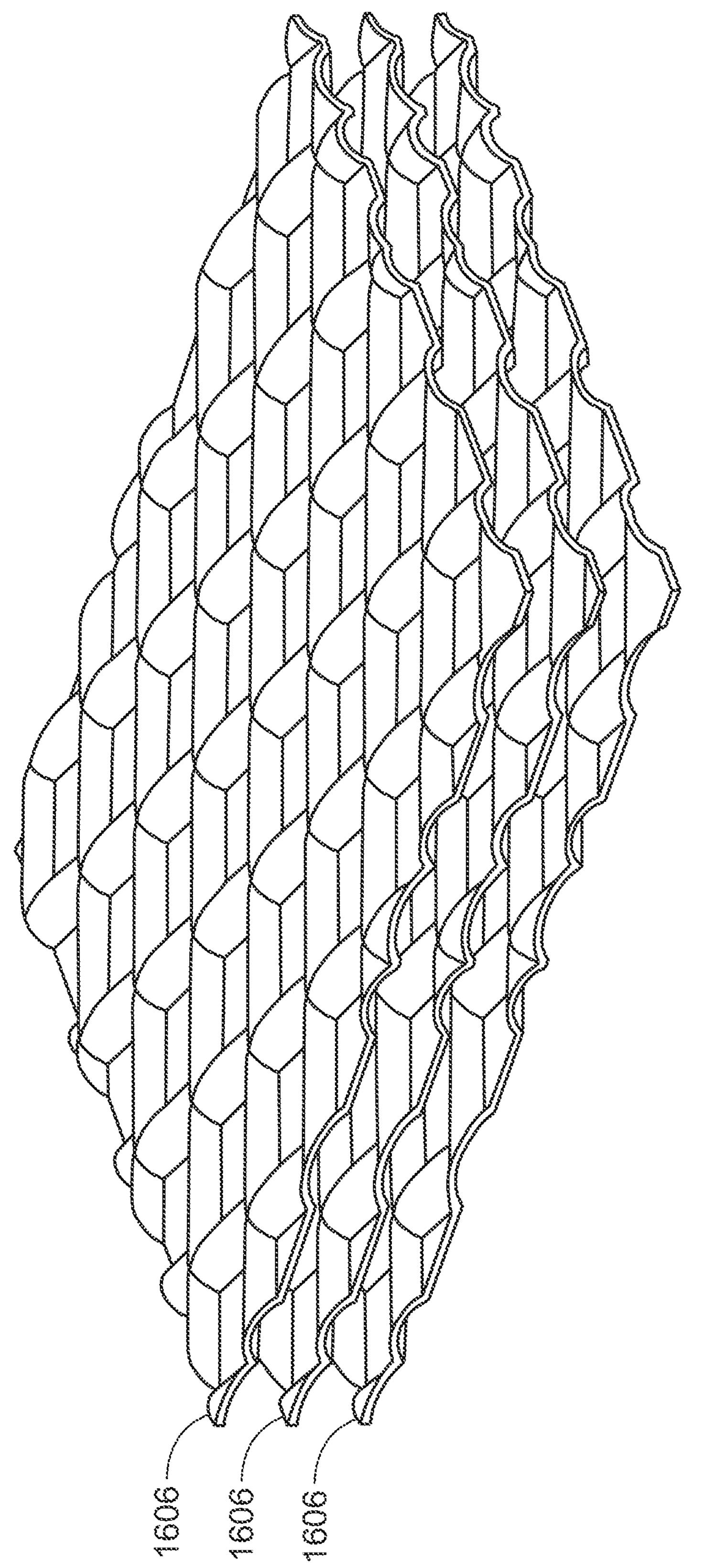
FIG. 17 is a drawing of a stacked arrangement of corrugated plates.

FIG. 16 and FIG. 17 show a corrugation pattern 1602 based on the line pattern in FIG. 13 and FIG. 15 with raised lines 1604, or ribs. FIG. 16 is a drawing of a coalescer plate 1606 having corrugation with alternating wetting and non-wetting surfaces based on a phyllotaxis pattern. In this embodiment, the raised ribs are wetting or non-wetting, and the flat areas are non-wetting or wetting. On the reverse surface of the coalescer plate, the recessed lines are non-wetting or wetting, and the flat areas are wetting or non-wetting.

FIG. 17 is a drawing of a stacked arrangement 1700 of coalescer plates 1606. In FIG. 17, the plate orientation and arrangement of the multiple parallel plates is shown for three plates, although coalescer assemblies will generally have more plates, such as 20, 50, or 200, or more. The stacked arrangement 1700 is applicable to dispersed oil in water separation, with the ribs on the top of the coalescer plate and recesses on the underside. In some embodiments, as oil droplets rise to the coalescer plate surface, wetting flat areas coalesce the oil droplets, which are channeled off of the plate in non-wetting recesses. Alternatively, the recesses may be wetting to coalesce the oil droplets rising to the plate as the oil droplets are diverted from non-wetting flat areas. For water droplets suspended in oil, the plate orientation is reversed and the ribbed surface is on the underside of the upper plate and the recesses are on the topside of the lower plate.

Corrugation

Figure 18A:
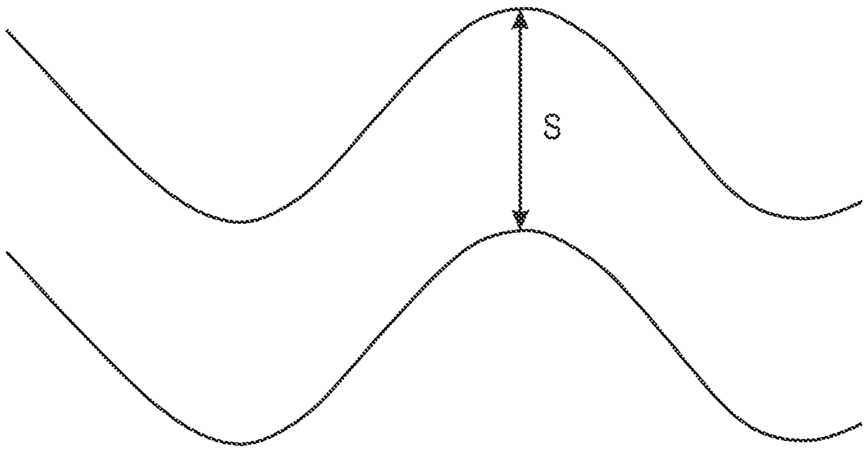
FIGS. 18A and 18B are drawings of profiles of corrugated coalescer plates.
Figure 18B:
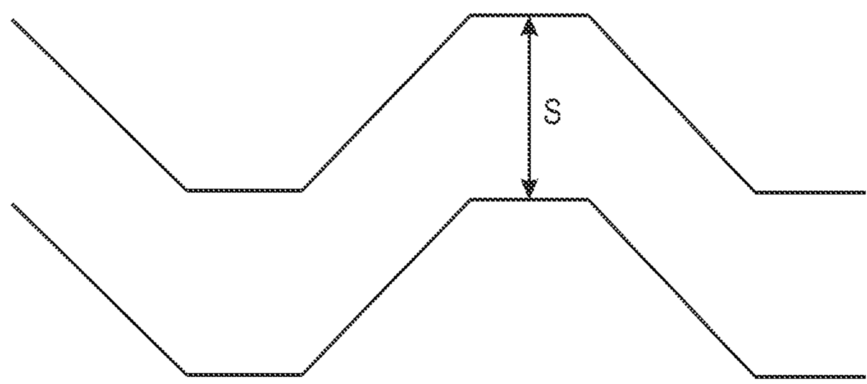

FIGS. 18A and 18B are drawings of profiles of corrugated coalescer plates. In each of these drawings, two stacked plates are shown. In some embodiments, the corrugation is sinusoidal as shown in FIG. 18A. In other embodiments, the corrugation is discrete sinusoidal as shown in FIG. 18B.

In embodiments described herein, the corrugated textured phyllotaxis patterned plates, using the node or line patterns shown in FIGS. 6 to 15, are assembled and stacked in alternative directions relative to one another. The directions or orientation is based on the phyllotaxis pattern described in FIG. 3 and FIG. 12. The plate spacing s is between about 10 to about 60 mm. In some embodiments, the plate spacing is about 10 mm, or about 20 mm, or about 40 mm, or about 60 mm. The plate spacing is determined by the separation to be performed, for example, wider plate spacing may be used for separation of water droplets from an oil continuous phase, while narrower plate spacing may be used for separation of oil droplets from a water continuous phase.

The plate separation is selected based, at least in part, on the flow rate, the density of the continuous and dispersed phases, the continuous phase viscosity, and the droplet size distribution of the dispersed phase. A smaller spacing gives a shorter settling or rising distance so that smaller droplets can be captured in the time the bulk liquid spends between the inlet and outlet of the coalescer. Further, wider spacing lowers the pressure drop between the inlet and outlet of the coalescer plate assembly. Accordingly, the plate spacing is adjusted to balance the efficiency of capturing entrained droplets and the pressure drop across the coalescer.

In some embodiments, the dispersed entrained phase capture on the coalescer plate produces a thicker film than in applications not using the patterns described. Thus, the plate spacing may be slightly larger spacing, such as 5% wider, 10% wider, or 20% wider, than standard parallel plate coalescers, which may lower the pressure drop. Similarly, coalescer plates at the same spacing, using the patterns described herein, will achieve improved coalescence and separation of the dispersed phase.

Coalescer Plates Assembly

As described herein, coalescer plates promote droplet-droplet interaction and coalescence of oil, or water, droplets. Coalescence produces large droplets that rise or settle faster due to the change in size-dependent buoyancy, for example, oil droplets that separate from a water continuous phase, coalesce, and rise faster or water droplets that separate from an oil continuous phase, coalesce, and settle faster. This leads to faster separation for a given residence time in the separator vessel, allowing increased flow rates as the separation efficiency increases.

In various embodiments, the coalescer plates are assembled together by stacking and maintaining a uniform spacing between the coalescer plates, forming a coalescer plate pack. The coalescer plate pack assembly is inserted in a phase separator, such as a water-oil separator or an oil-water separator. The coalescer plate packs are arranged in the separator so that the continuous phase flows through the plates, allowing the droplets of the immiscible liquid to contact the plates and coalesce.

Parallel plate coalescers are employed in multiphase oil-water or water-oil separators in crude oil production. In produced water treatment in the crude oil production industry, there are concentration and droplet cut-off sizes for various technologies, such as the gravity-based Water-Oil Separator (WOSEP). Typical API/CPI (API Specification 421, CPI—Corrugated Plate Interceptor) water-oil separators achieve an outlet oil-in-water concentration of 50 to 100 ppm for an inlet feed oil in water concentration of up to 10,000 ppm (1% vol.) and use coalescing plates to increase the dispersed oil droplet sizes to promote faster rise velocities and separation from the bulk water. In separation of water from wet crude oil streams, coalescer plate assemblies are used as internal components in separator vessels to promote increased water separation from the wet crude oil feed stream. In various embodiments described herein, the coalescer plates are planar or corrugated, and have a pattern based on the phyllotaxis as described with respect to the previous figures.

In the cross-flow configuration, the plates are aligned parallel to the flow direction and inclined by 20° to 60° in the transverse direction, or about 45°. The angle is determined by minimizing the vertical distance between the plates (smaller angle) and maximizing the drainage (larger angle). For low concentrations of the dispersed phase, a smaller angle is generally used, except when the dispersed phase is more viscous than the continuous phase, such as oil-in-water. When the dispersed phase is more viscous, then plate angle is increased to lower the risk of fouling. The inter-plate spacing is 10 to 60 mm depending on the crude oil API gravity and viscosity. Plate spacing increases with decreases in API gravity and temperature. The plates are flat or corrugated. In some embodiments, the corrugated plates have the corrugation aligned between successive plates. In other embodiments, the corrugated plates alternate the orientation of the corrugation according to the patterns described earlier. The orientation of the plate pattern with respect to the direction of the incoming fluid flow is for the handedness to align the eight parastichy, as described with respect to FIG. 4, from the inlet lower corner to outlet upper corner of the plate. The plates on one half of the vessel have the opposite handedness to the plates on the other half of the vessel.

Figure 19:
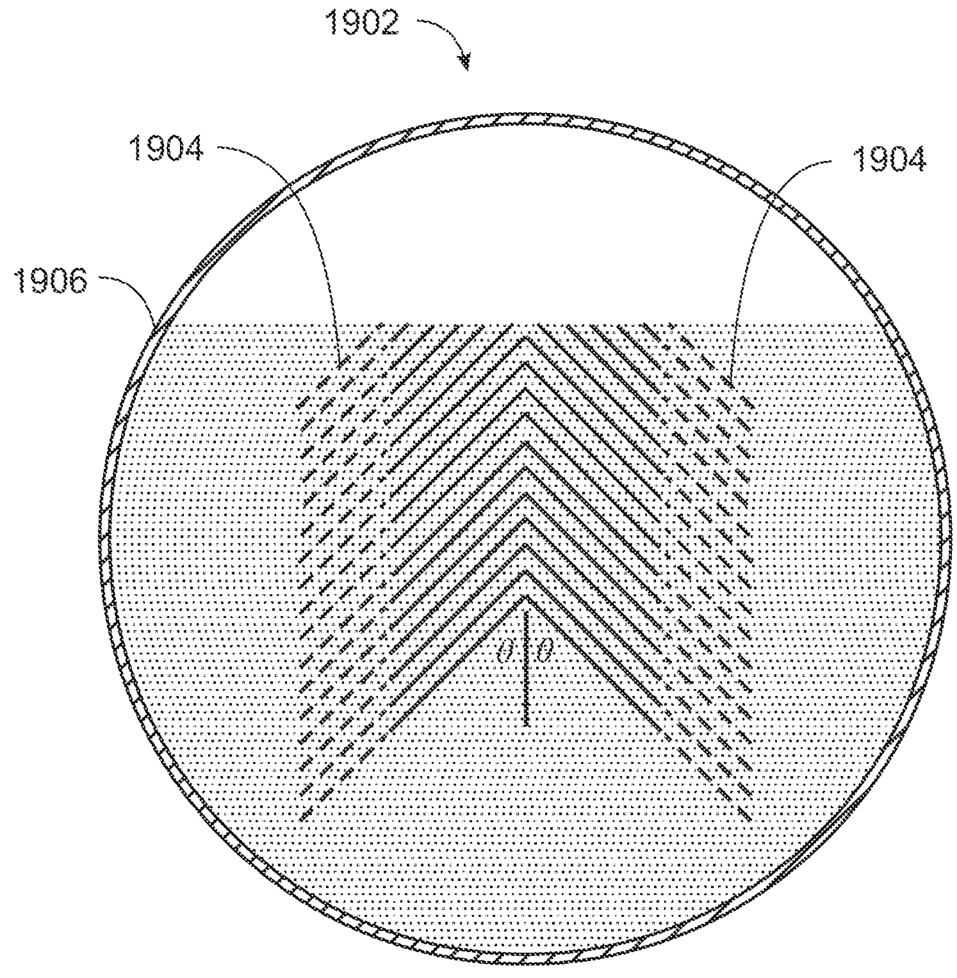
FIG. 19 is a cross-sectional view of a coalescer showing a cross-flow arrangement of coalescer plates for the separation of entrained oil droplets from a water continuous phase.

FIG. 19 is a cross-sectional view of a coalescer 1900 showing a cross-flow arrangement 1902 of coalescer plates 1904 for the separation of entrained oil droplets from a water continuous phase. In this embodiment, the coalescer plates 1904 are oriented at 0=45° from the vertical. In some embodiments, the coalescer plates 1904 are whole plates that extend from the middle of the vessel to the vessel wall 1906 and are retained in a frame (not shown).

The oil coalescing and removal efficiency is a function of maintaining laminar flow between the coalescer plates 1904, inter-plate spacing, the plate surface area, plate angle, corrugation curvature, and texture pattern of wetting and non-wetting surfaces. Instrumentation is used to measure oil in water or water in oil at the inlet and outlet of the coalescer 1900, or upstream and downstream of the coalescer plates 1904, to verify separation performance. In some embodiments, the separation performance is used as feedback to control the upstream and downstream separation units, for example, controlling the flow rate through the coalescer 1900.

Figure 20:
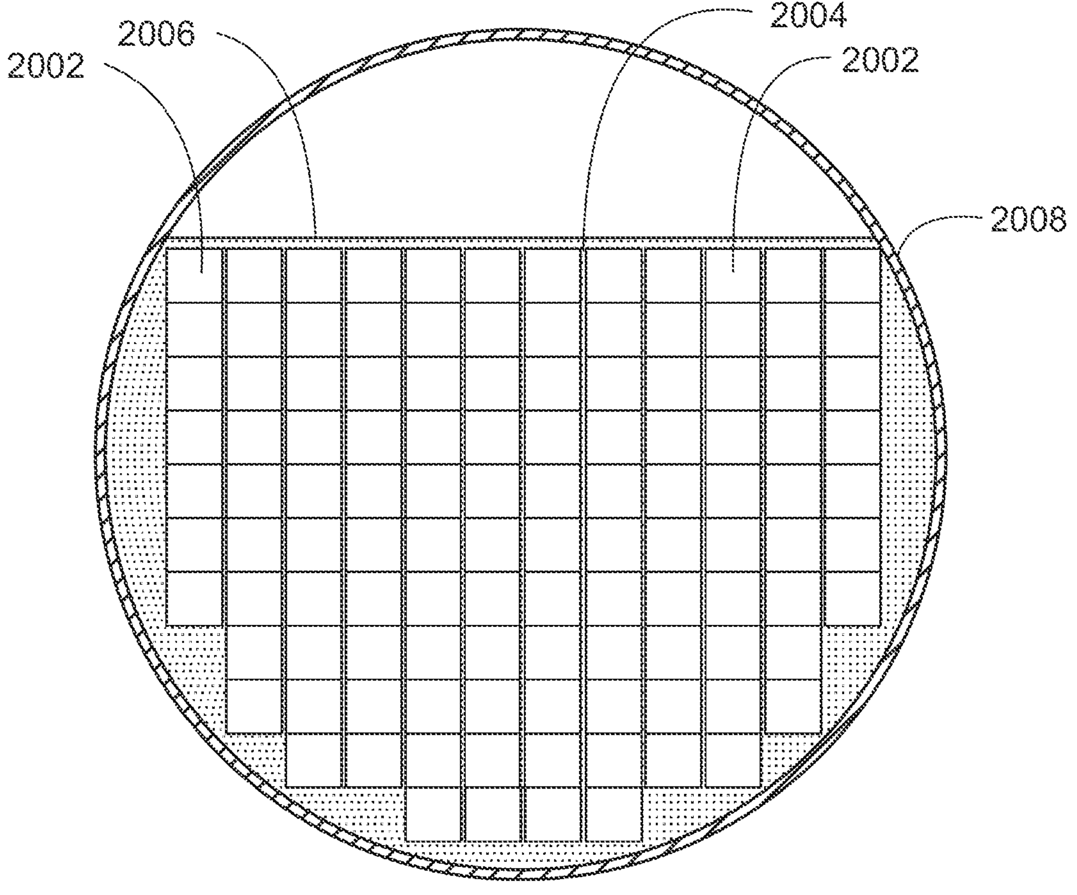
FIG. 20 is a cross-sectional view of a coalescer showing coalescer plate modules with multiple plates in each square cross-section module.

FIG. 20 is a cross-sectional view of a coalescer 2000 showing coalescer plate modules 2002 with multiple plates in each square cross-section module. The modules are stacked and arranged with the plate directions aligned on each half of the vessel inclined from the vessel wall upward towards the vessel center. In each of the coalescer plate modules 2002, multiple 45° plates are arranged with a vertical channel 2004 between coalescer plate modules 2002 for oily water to rise to the liquid level 2006 in the coalescer 2000. Coalescer plate modules 2002 on each half of the coalescer 2000 are oriented in opposite directions.

The area between the coalescer plate modules 2002 and the vessel wall 2008 is closed by a supporting stair-step frame mounted to the vessel wall 2008 that prevents flow from by-passing around the coalescer plate modules 2002. Typical unit boxes used for the coalescer plate modules 2002 are sized at about 250 mm×250 mm to pass through manways on separator vessels.

Figure 21:
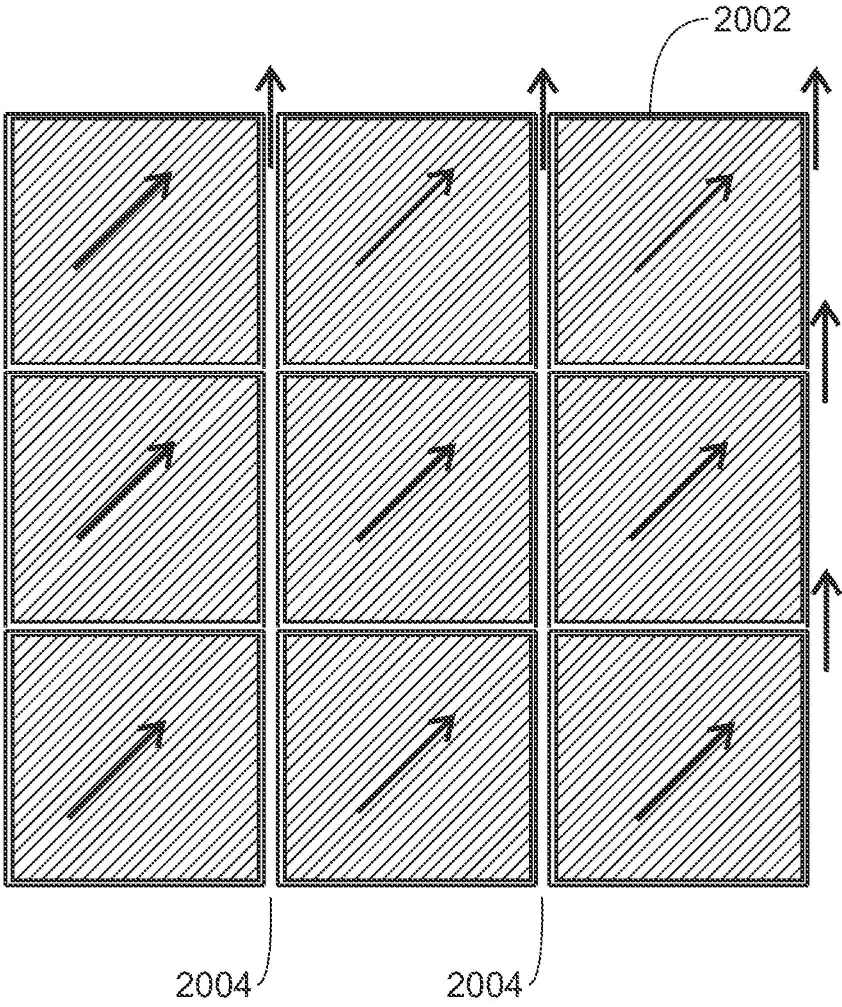
FIG. 21 is a cross-sectional view of a 3×3 arrangement of coalescer plate modules with the oil flow direction indicated by arrows.

FIG. 21 is a cross-sectional view 2100 of a 3×3 arrangement of coalescer plate modules 2002 with the coalesced oil droplets flow direction indicated by arrows. Like numbered items are as described with respect to FIG. 20. The cross-sectional view 2100 also illustrates the vertical channel 2004 for the rising oil droplets. The flow of the continuous phase would be directly into the cross-sectional view 2100.

Figure 22:
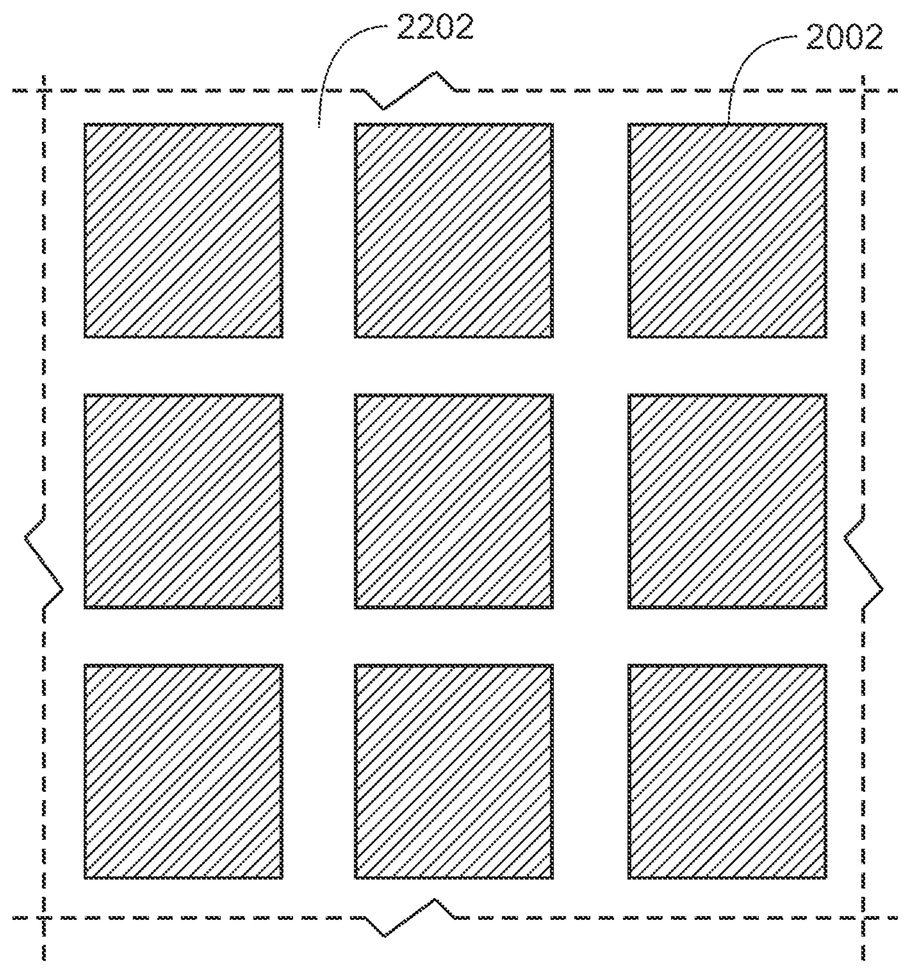
FIG. 22 is a front view of a lattice plate mounted in front of the coalescer plate modules.

FIG. 22 is a front view of a lattice plate 2202 mounted in front of the coalescer plate modules 2002. The lattice plate 2202 blocks the continuous phase flow from disturbing the oil droplets rising between the coalescer plate modules 2002, as illustrated in FIG. 21. As described herein, as the oil droplets rise, they can carry a flow of water, thus, oily water, e.g., oil with a small amount of water is separated. Similarly, when water entrained in an oil phase is separated, a small amount of oil may be removed with the water. The lattice plate 2202 also guides the ingress of water into the coalescer plate modules 2002, and prevents the ingress of water into the vertical channels between the coalescer plate modules.

Figure 23:
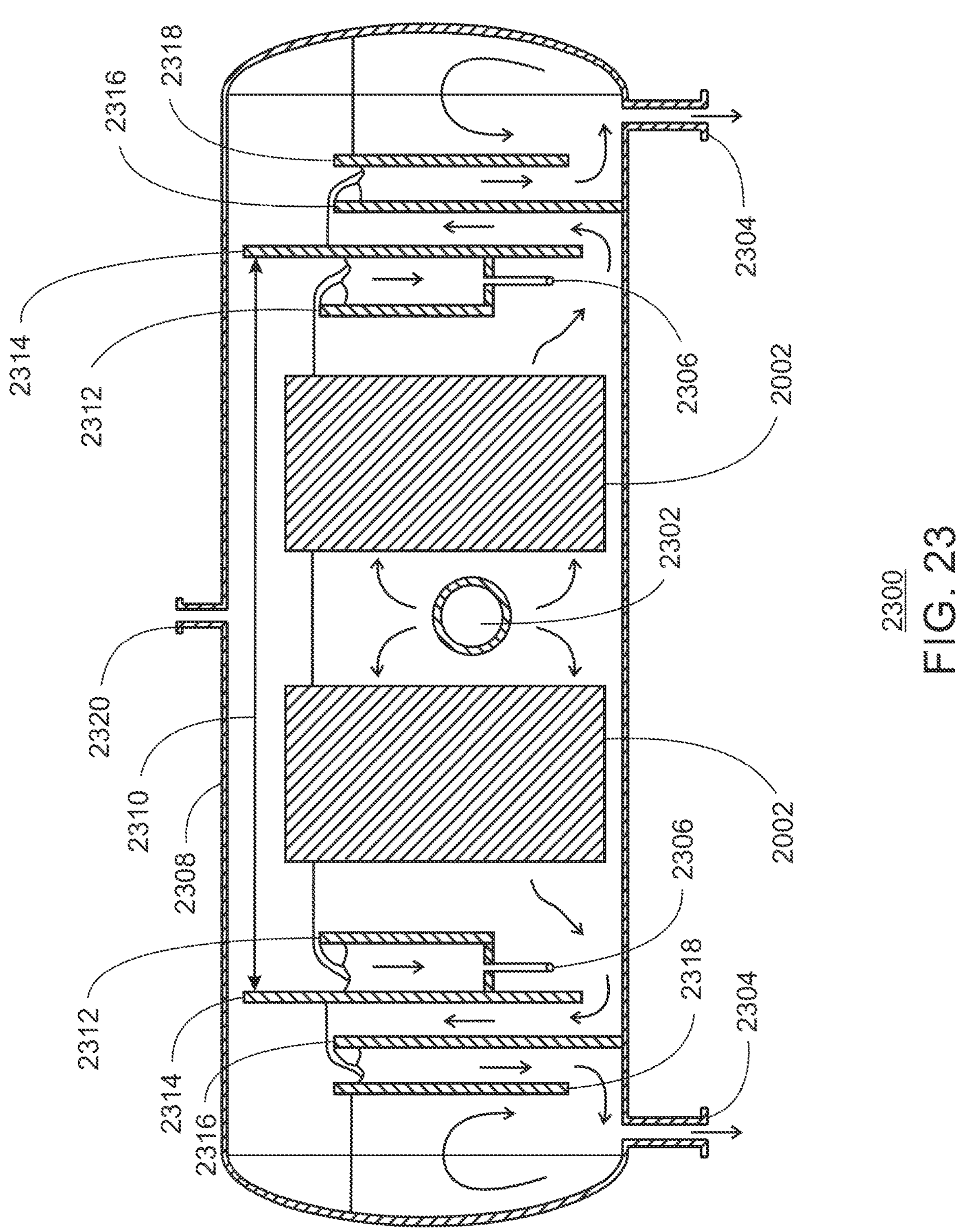
FIG. 23 is a schematic drawing of a water-oil separator or coalescer with coalescer plate modules for the coalescence of oil droplets.

FIG. 23 is a schematic drawing of a water-oil separator or coalescer 2300 with coalescer plate modules 2002 for the coalescence of oil droplets. Like numbered items are as described with respect to FIG. 20. The coalescer plate module 2002 or assembly is inserted into the coalescer 2300 and immersed in the axial vessel flow to promote separation of the dispersed phase from the continuous phase. The feed stream introduced into the water inlet 2302 is water that is contaminated with oil, for example, produced water as a by-product of the upstream crude oil dehydration process units that remove water from a wet crude oil stream.

In this embodiment, the coalescer 2300 uses a split flow with one water inlet 2302, two water outlets 2304, and two oil outlets 2306. The coalescer 2300 has a vessel 2308 with a tan-to-tan length (L) and a length to diameter (L/D) ratio between about 10.9-13.5. As used herein, the tan-to-tan length is excluding the semi-elliptical or hemispherical or other heads. The ratio of the length 2310 of the separation compartment to the length of the vessel (S/L) is between about 0.68 and about 0.77. The retention time for the deed stream, such as the produced water, is between about 15 and about 35 minutes.

The feed stream, such as the oily produced water from upstream crude oil dehydration process units, enters the water-oil separator through the water inlet 2302 and is distributed into the separation compartment. The water flows through the coalescer plate modules 2002 and oil is coalesced into larger droplets.

The oil floats to the surface and is skimmed off by oil skimmers 2312. The oil or oily water stream is recovered to the oil production stream through the oil outlets 2306. Oil baffles 2314 prevent oil from being carried over into the treated water. Water weirs 2316 and water baffles 2318 slow the water flow to allow any residual oil to separate from the water, before the treated water leaves the separator through the water outlets 2304 for additional treatment, injection or disposal. A blanket gas may be introduced into the coalescer 2300 through a gas inlet 2320.

EXAMPLES

With the wetting node pattern described herein, experiments have demonstrated that droplets are captured by the wetting nodes and subsequent droplets can merge or coalesce, or may bounce off the coalesced droplet adhering to the wetting node. For the angled plates, the droplets that bounce off the initial droplet will continue to follow non-wetting area of the plate around subsequent wetting nodes until getting caught on a wetting node. The patterns tested were a single node pattern, as described with respect to FIG. 6, and a single line pattern, as described with respect to FIG. 12. The line pattern used recessed lines, as described with respect to FIG. 14 B.

Testing of Patterned Coalescer Plate

A study of crude oil droplet motion on plates immersed in water was conducted. The purpose was to determine the influence of the phyllotaxis derived pattern on the droplet motion.

Figure 24:
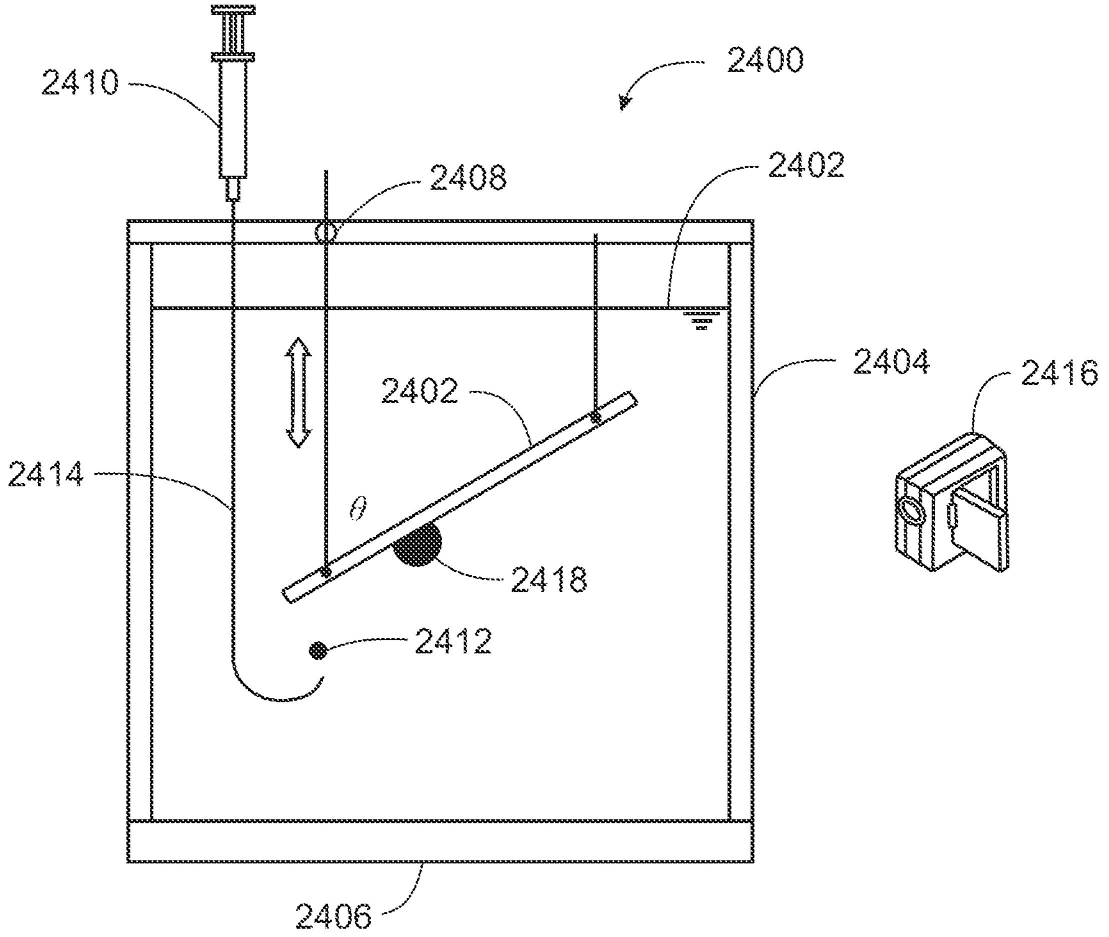
FIG. 24 is a drawing of a test cell used for testing a pattern on a test plate.

FIG. 24 is a drawing of a test cell 2400 used for testing a pattern on a test plate 2402. The test cell 2400 is made from a transparent polyacrylate cylinder 2404 with a 6¼" inner diameter and a 6" height. The polyacrylate cylinder 2404 is sealed to a base 2406, which may be made from nylon, forming a bath for the simulation of the continuous phase.

The test plate 2402 is a stainless steel 304 plate of 4" length and 3" width. The test plate 2402 is hung in the test cell 2400 at an angle that is adjustable between 10° and 60°, using an adjustable mount 2408. Different plate surface finishes were studied. In some tests, the test plate 2402 was prepared with 220 grit sanding. Addition polishing with a grinder was done on some of the plates, for example, in smooth regions. The surface was chemically treated to impart oleophobic or oleophilic properties. The test cell 2400 was filled with deionized, reverse osmosis water. Crude oil used was Arab Light stabilized crude. The experiments were conducted at room temperature, e.g., about 75° F.

A syringe 2410 was used to inject droplets 2412 through a cannula 2414 with an opening below the test plate 2402. A camera 2416 was used to monitor the droplets 2412 as they floated up to the test plate 2402 and coalesced into larger droplets 2418.

Figure 25B:
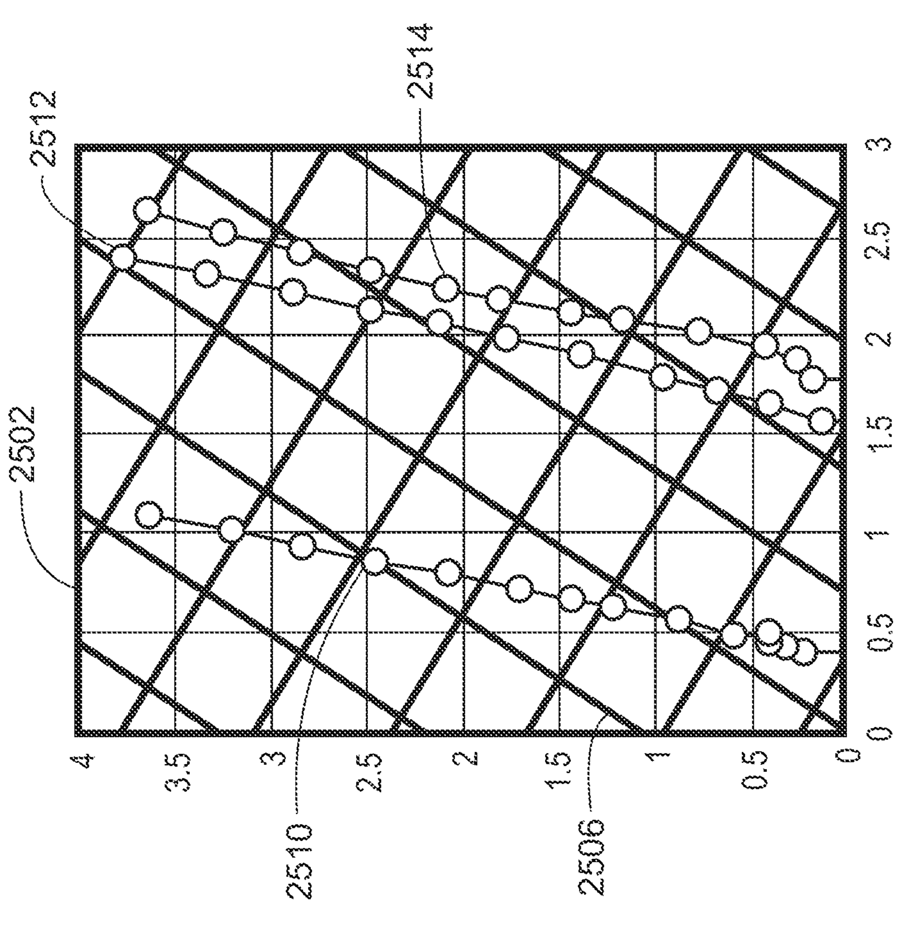
FIGS. 25A and 25B are drawings of oil droplet trajectories on inclined, flat non-wetting plates showing droplet trajectory bias on a patterned plate versus an un-patterned plate.
Figure 25A:
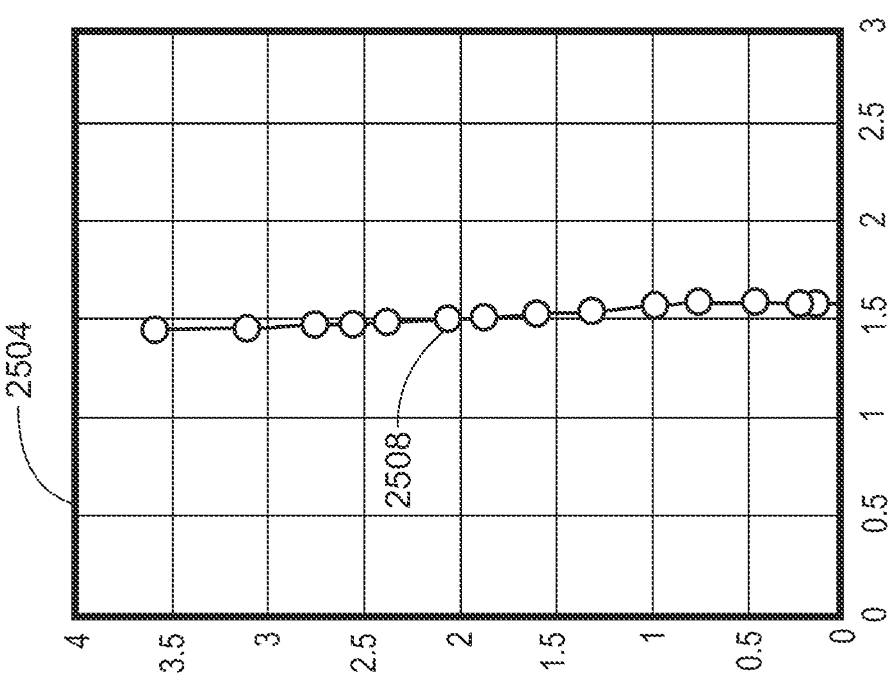

FIGS. 25A and 25B are drawings of oil droplet trajectories on inclined, flat non-wetting plates showing droplet trajectory bias on a patterned plate 2502 versus an unpatterned plate 2504. In this test, the patterned plate 2502 has lines 2506 arranged in a phyllotaxis pattern of 1 mm wide and 0.1 mm deep.

FIG. 25A is a schematic drawing of a trajectory 2508 of a droplet on an inclined, unpatterned plate 2504 that is non-wetting. On the unpatterned plate 2504, the droplet 2508 rolls straight up the plate.

FIG. 25B is a schematic drawing of trajectories 2510, 2512, and 2514 of droplets on the patterned plate 2502, which has a phyllotaxis pattern of lines 2506 on the plate. In this example, the entire plate was non-wetting, e.g., not chemically treated. On the patterned plate 2502, the trajectories 2510, 2512, and 2514 of the droplets have a bias to the right based on the phyllotaxis pattern.

FIGS. 26A, 26B, 26C, and 26D are a sequence of images from experiments showing the motion of droplets observed on a patterned plate 2602 having a phyllotaxis pattern of wetting nodes 2604 surrounded by a non-wetting regions. To simplify the drawing, not all of the wetting nodes 2604 are labeled. The droplets contacting the plate on a non-wetting area allow the droplet to roll until wetting a node area. Subsequent droplets roll up the non-wetting plate or coalesce with droplets on a wetting node area. In this test the diameter of the nodes was 5 mm. The node was raised or protruded from the plate surface by 0.1 mm.

Figures 26A, 26B, 26C, 26D:
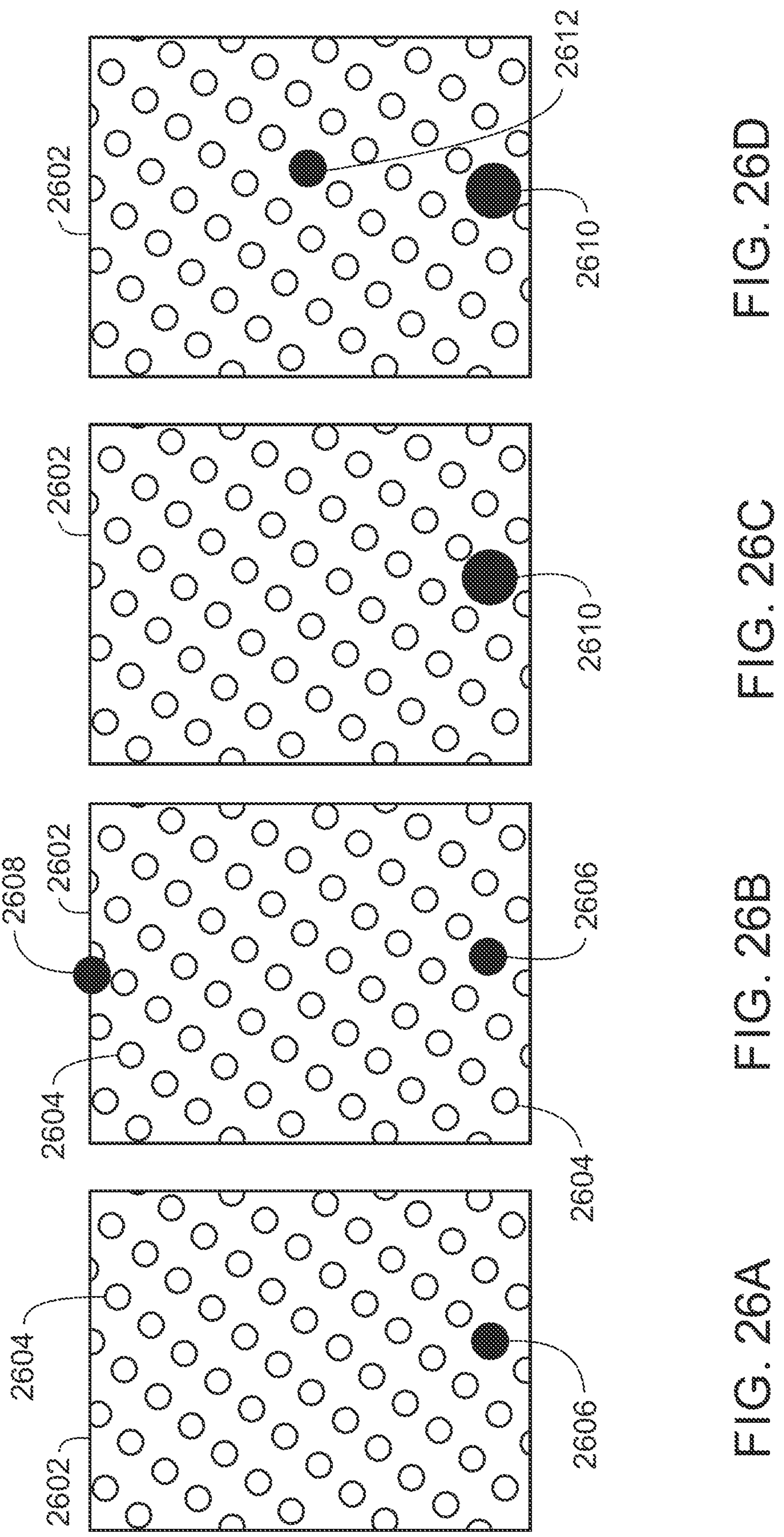
FIGS. 26A, 26B, 26C, and 26D are a sequence of images from experiments showing the motion of droplets observed on a patterned plate having a phyllotaxis pattern of wetting nodes surrounded by a non-wetting regions.

In FIG. 26A, a first droplet 2606 rises to the patterned plate 2602 and wets the wetting node 2604 closest to where it impacted the patterned plate 2602. In FIG. 26B, a second droplet 2608 contacts the patterned plate 2602 and rolls past the first droplet 2606 and off the top of the patterned plate 2602 avoiding the wettable node areas. In FIG. 26C, a third droplet coalesces with the first droplet forming a larger coalesced droplet 2610. In FIG. 26D, a fourth droplet 2612 contacts the patterned plate 2602 and rolls past the coalesced droplet 2610 and wets a wetting node 2604 further up the patterned plate 2602.

An embodiment described herein provides a coalescer plate for separating a mixture of immiscible fluids. The coalescer plate includes a pattern of wetting and non-wetting regions, wherein the pattern is based, at least in part, on phyllotaxis.

In an aspect, the pattern is a spiral based, at least in part, on a Fibonacci sequence. In an aspect, the pattern is arranged in a spiral according to a Golden ratio. In an aspect, an angle between consecutive nodes in the pattern is about 137.5°. In an aspect, the pattern includes nodes that are circular, square, rectangular, rhombic, or triangular, or any combinations thereof. In an aspect, the pattern is a Lucas spiral, an anomalous spiral, a bijugate, a multijugate, a tricussate, or a whorled pattern.

In an aspect, the pattern includes protrusions. In an aspect, the protrusions include a surface that is substantially perpendicular to fluid flow. In an aspect, the protrusions are overlapping.

In an aspect, the pattern includes recesses. In an aspect, the recesses include a surface that is substantially perpendicular to fluid flow.

In an aspect, the pattern is formed into a bottom surface of the coalescer plate to separate oil droplets from a water continuous phase. In an aspect, the pattern is formed into a top surface of the coalescer plate to separate water droplets from an oil continuous phase. In an aspect, the pattern is formed into a top surface of the coalescer plate to separate water droplets from a gas continuous phase.

In an aspect, the pattern includes lines. In an aspect, the lines are raised. In an aspect, the lines are recessed. In an aspect, the lines include raised ribs. In an aspect, the coalescer plate is corrugated.

Another embodiment described herein provides a coalescer plate assembly. The coalescer plate assembly includes a plurality of coalescer plates, wherein each coalescer plate includes a pattern of wetting and non-wetting regions based, at least in part, on phyllotaxis. The plurality of coalescer plates is assembled into a stack with a uniform distance between each of the coalescer plates.

In an aspect, the coalescer plates are aligned parallel to a direction of flow. In an aspect, the coalescer plates are inclined by 20° to 60° transverse to a direction of flow. In an aspect, a spacing between two coalescer plates is between about 10 millimeters (mm) and about 60 mm.

In an aspect, the plurality of coalescer plates are arranged into a plurality of unit modules with a vertical channel between each unit module to allow oily water to rise to a liquid level. In an aspect, the plurality of coalescer are arranged into a plurality of unit modules with a vertical channel between each unit module to allow water to sink to the bottom of the coalescer.

Another embodiment described herein provides a coalescer including a coalescer plate, where the coalescer plate includes a pattern of wetting and non-wetting regions, wherein the pattern is based, at least in part, on phyllotaxis.

In an aspect, the coalescer includes a plurality of coalescer plates, wherein each coalescer plate of the plurality of coalescer plates includes a pattern of wetting and non-wetting regions, wherein the pattern is based, at least in part, on phyllotaxis. In an aspect, the coalescer plates on one half of the coalescer are oriented in an opposite direction from coalescer plates on the other half of a vessel.

Other implementations are also within the scope of the following claims.

What is claimed is:

1. A coalescer plate for separating a mixture of immiscible fluids, comprising a pattern of wetting and non-wetting regions, wherein the wetting regions are oleophilic and the non-wetting regions are oleophobic when droplets of oil are entrained in a water continuous phase, and the wetting regions are oleophilic and the non-wetting regions are oleophobic when droplets of water are entrained in an oil continuous phase, and wherein the pattern is based on a planar projection of a pattern found on leaves on a plant stem, and wherein the pattern comprises recesses.

2. The coalescer plate of claim 1, wherein the recesses comprise a spiral based, at least in part, on a Fibonacci sequence.

3. The coalescer plate of claim 1, wherein the recesses are arranged in a spiral according to a golden ratio.

4. The coalescer plate of claim 1, wherein an angle between consecutive nodes of the recesses is about 137.5°.

5. The coalescer plate of claim 1, wherein the recesses comprise nodes that are circular, square, rectangular, rhombic, a parallelogram or triangular, or any combinations thereof.

6. The coalescer plate of claim 1, wherein the recesses are arranged in a Lucas spiral, an anomalous spiral, a bijugate, a multijugate, a tricussate, or a whorled pattern.

7. The coalescer plate of claim 1, wherein the recesses comprise a surface that is substantially perpendicular to fluid flow.

8. The coalescer plate of claim 1, wherein the recesses are formed into a bottom surface of the coalescer plate to separate oil droplets from a water continuous phase.

9. The coalescer plate of claim 1, wherein the recesses are formed into a top surface of the coalescer plate to separate water droplets from an oil continuous phase.

10. The coalescer plate of claim 1, wherein the recesses are formed into a top surface of the coalescer plate to separate water droplets from a gas continuous phase.

11. The coalescer plate of claim 1, wherein the recesses comprise lines.

* * * * *